US012016019B2

(12) United States Patent
Bai et al.

(10) Patent No.: US 12,016,019 B2
(45) Date of Patent: Jun. 18, 2024

(54) MULTIPLE TRP PDSCH SCHEDULING USING DCI WITHOUT TCI FIELD

(71) Applicant: QUALCOMM Incorporated, San Diego, CA (US)

(72) Inventors: Tianyang Bai, Somerville, NJ (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 266 days.

(21) Appl. No.: 17/450,274

(22) Filed: Oct. 7, 2021

(65) Prior Publication Data

US 2022/0132543 A1    Apr. 28, 2022

Related U.S. Application Data

(60) Provisional application No. 63/104,776, filed on Oct. 23, 2020.

(51) Int. Cl.
*H04W 72/12* (2023.01)
*H04W 72/02* (2009.01)
(Continued)

(52) U.S. Cl.
CPC ....... *H04W 72/1273* (2013.01); *H04W 72/02* (2013.01); *H04W 72/044* (2013.01); *H04W 72/23* (2023.01)

(58) Field of Classification Search
CPC . H04W 72/1273; H04W 72/23; H04W 72/02; H04W 72/04; H04W 72/042;
(Continued)

(56) References Cited

U.S. PATENT DOCUMENTS

2020/0053757 A1\* 2/2020 Bagheri ................ H04L 5/0058
2020/0351892 A1\* 11/2020 Yi .......................... H04L 5/0092
(Continued)

FOREIGN PATENT DOCUMENTS

WO     2021191874 A1     9/2021

OTHER PUBLICATIONS

International Search Report and Written Opinion—PCT/US2021/054276—ISA/EPO—Feb. 1, 2022.
(Continued)

*Primary Examiner* — Candal Elpenord
(74) *Attorney, Agent, or Firm* — QUALCOMM Incorporated

(57) ABSTRACT

Aspects presented herein may enable a UE and/or a base station to identify a TCI state for each of the multiple TRPs when the DCI does not include a TCI state. For examples, aspects presented herein may enable the UE and/or the base station to identify TCI states from different TRPs based at least in part on one of a default beam rule, the TCI state used for transmitting PDCCH, or the TCI state used for transmitting previous/last PDSCH. In one aspect, an apparatus receives a single DCI from one TRP of a base station or multiple DCIs from multiple TRPs of the base station that do not contain a TCI state. Then the apparatus receive PDSCH from the multiple TRPs of the base station based on a TCI state in which the PDSCH is to be transmitted from each of the multiple TRPs of the base station.

29 Claims, 18 Drawing Sheets

(51) Int. Cl.
*H04W 72/04* (2023.01)
*H04W 72/044* (2023.01)
*H04W 72/1273* (2023.01)
*H04W 72/23* (2023.01)

(58) Field of Classification Search
CPC ............. H04W 72/1243; H04L 5/0094; H04L 5/0044; H04L 5/0035; H04L 5/0023
USPC ................................................ 370/329–330
See application file for complete search history.

(56) References Cited

U.S. PATENT DOCUMENTS

| | | | |
|---|---|---|---|
| 2022/0070899 A1* | 3/2022 | Huang | H04L 5/0044 |
| 2022/0217729 A1* | 7/2022 | Kim | H04W 72/1263 |
| 2022/0312485 A1* | 9/2022 | Zhang | H04L 5/0073 |
| 2022/0393724 A1* | 12/2022 | Matsumura | H04B 7/0413 |
| 2023/0076897 A1* | 3/2023 | Svedman | H04W 72/23 |
| 2023/0164786 A1* | 5/2023 | Wang | H04L 5/0037 |
| | | | 370/329 |

OTHER PUBLICATIONS

VIVO: "Remaining Issues on Multi-TRP Operation", 3GPP Draft, R1-2005354, 3GPP TSG RAN WG1 #102-e, 3rd Generation Partnership Project (3GPP), Mobile Competence Centre, vol. RAN WG1, No. e-Meeting, Aug. 17, 2020-Aug. 28, 2020, Aug. 8, 2020 (Aug. 8, 2020), XP051917379, 12 Pages, Retrieved from the Internet: URL: https://ftp.3gpp.org/tsg_ran/WG1_RL1/TSGR1_102-e/Docs/R1-2005354.zip, R1-2005354_Remaining issues on Multi TRP operation_final.docx [retrieved on Aug. 8, 2020] Sections 2, 2.1, 2.1.1, 2. 1.2, 2.2.1, 2.5, 5.

VIVO: "Discussion on Remaining Issues on Multi-TRP Operation", 3GPP Draft, R1-2001678, 3GPP TSG RAN WG1 #100bis, 3rd Generation Partnership Project (3GPP), Mobile Competence Centre, vol. RAN WG1, No. e-Meeting, Apr. 20, 2020-Apr. 30, 2020, Apr. 11, 2020 (Apr. 11, 2020), XP051875227, 17 Pages, Retrieved from the Internet: URL: https://ftp.3gpp.org/tsg_ran/WG1_RL1/TSGR1_100b_e/Docs/R1-2001678.zip R1-2001678_Discussion on remaining issues on multi TRP operation_final. docx [retrieved on Apr. 11, 2020] sections 2.2, 2.2.1, 5, the whole document.

* cited by examiner

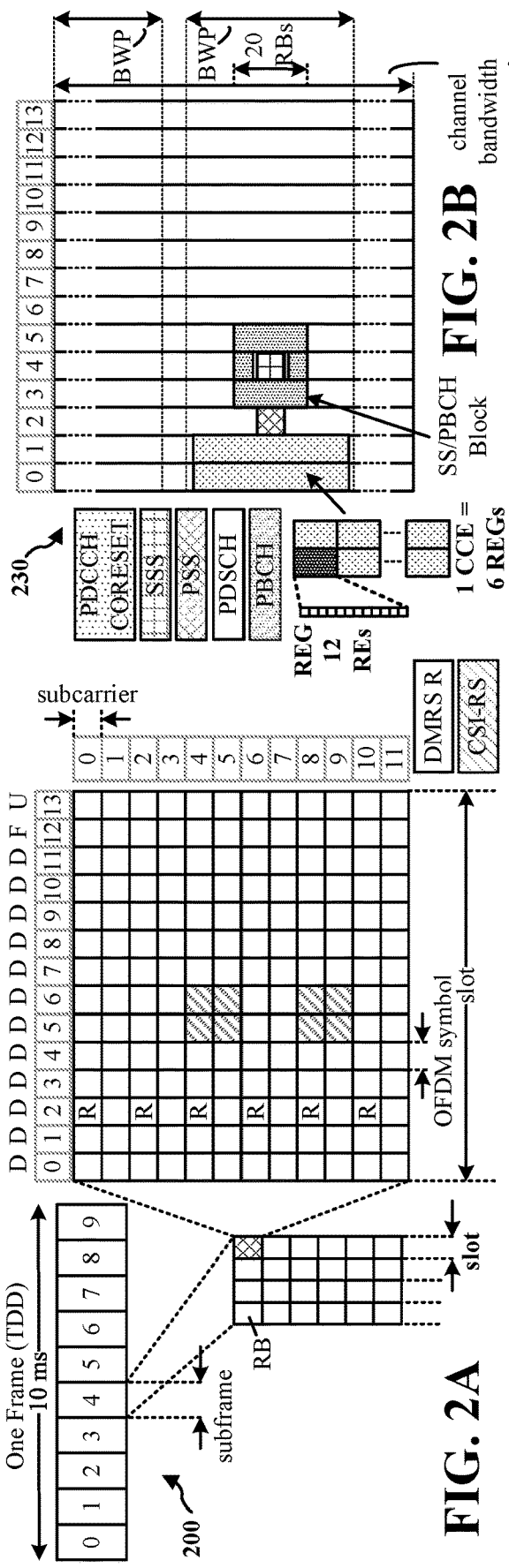
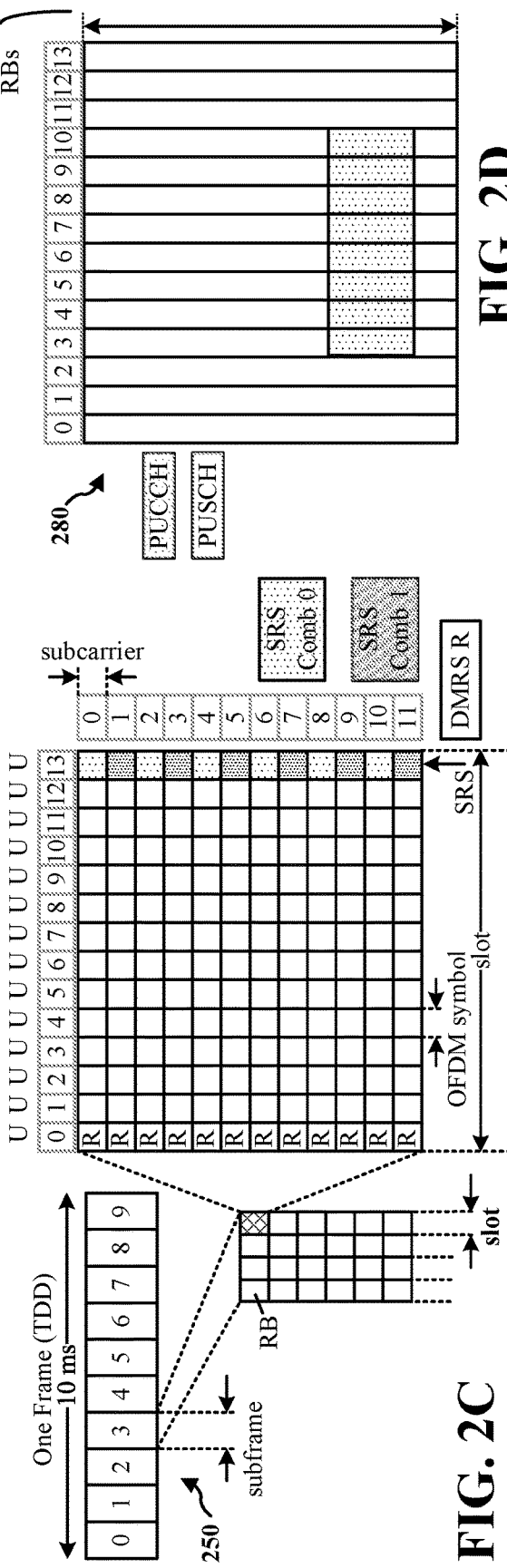
FIG. 2A
FIG. 2B
FIG. 2C
FIG. 2D

MULTIPLE TRP PDSCH SCHEDULING USING DCI WITHOUT TCI FIELD

CROSS REFERENCE TO RELATED APPLICATION(S)

This application claims the benefit of and priority to U.S. Provisional Application Ser. No. 63/104,776, entitled "MULTIPLE TRP PDSCH SCHEDULING USING DCI WITHOUT TCI FIELD" and filed on Oct. 23, 2020, which is expressly incorporated by reference herein in its entirety.

BACKGROUND

Technical Field

The present disclosure relates generally to communication systems, and more particularly, to wireless communication involving transmission configuration indicator states.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus may receive a single downlink control information (DCI) from one transmission and reception point (TRP) of a base station or multiple DCIs from multiple TRPs of the base station that do not contain a transmission configuration indicator (TCI) state. The apparatus may also determine a TCI state in which physical downlink shared channel (PDSCH) is to be transmitted from each of the multiple TRPs of the base station.

In an aspect of the disclosure, a method, a computer-readable medium, and an apparatus are provided for wireless communication at a base station. The apparatus may transmit, to a UE, a single DCI from one TRP of the base station or multiple DCIs from multiple TRPs of the base station that do not contain a TCI state. The apparatus may also transmit PDSCH to the UE through the multiple TRPs of the base station using a TCI state for each of the multiple TRPs.

In an aspect of the disclosure, a method, a computer-readable medium, and an apparatus are provided for wireless communication at a UE. The apparatus may receive a single DCI from one TRP of a base station or multiple DCIs from multiple TRPs of the base station that do not contain a TCI state. The apparatus may receive PDSCH from the multiple TRPs of the base station based on a TCI state in which the PDSCH is to be transmitted from each of the multiple TRPs of the base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
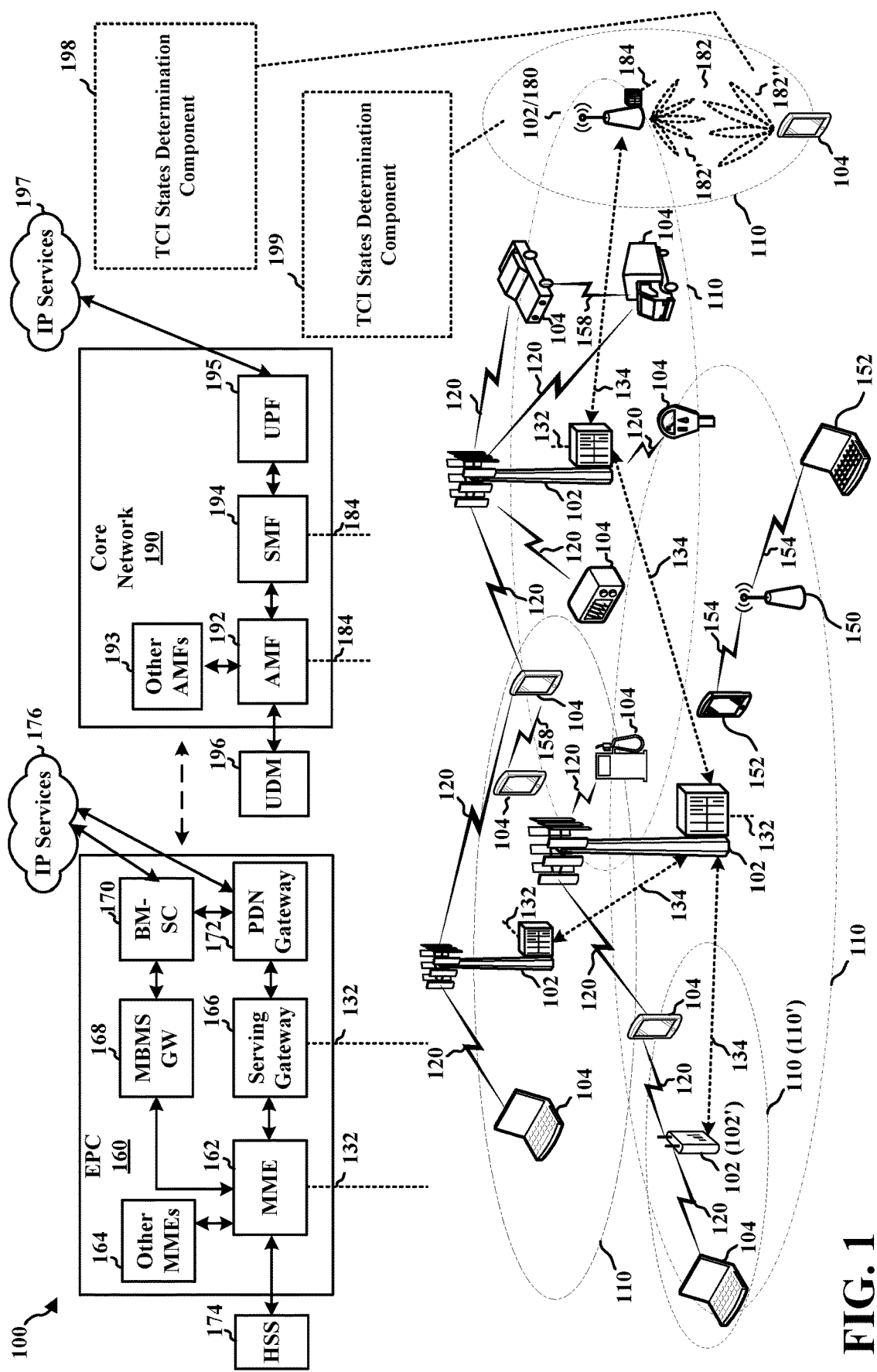
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

Aspects presented herein may enable a UE and/or a base station to identify a TCI state for each of the multiple TRPs when the DCI does not include a TCI state. In certain aspects, the UE 104 may include a TCI states determination component 198 configured to determine one or more beams from multiple TRPs of a base station. In one aspect, the TCI states determination component 198 may be configured to receive a single DCI from one TRP of a base station or multiple DCIs from multiple TRPs of the base station that do not contain a TCI state. The TCI states determination component 198 may also be configured to receive PDSCH from the multiple TRPs of the base station based on a TCI state in which PDSCH is to be transmitted from each of the multiple TRPs of the base station. In certain aspects, the base station 102/180 may include a TCI states determination component 199 configured to transmit, to a UE, a single DCI from one TRP of the base station or multiple DCIs from multiple TRPs of the base station that do not contain a TCI state. The TCI states determination component 199 may also be configured to transmit PDSCH to the UE through the multiple TRPs of the base station using a TCI state for each of the multiple TRPs.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25

GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
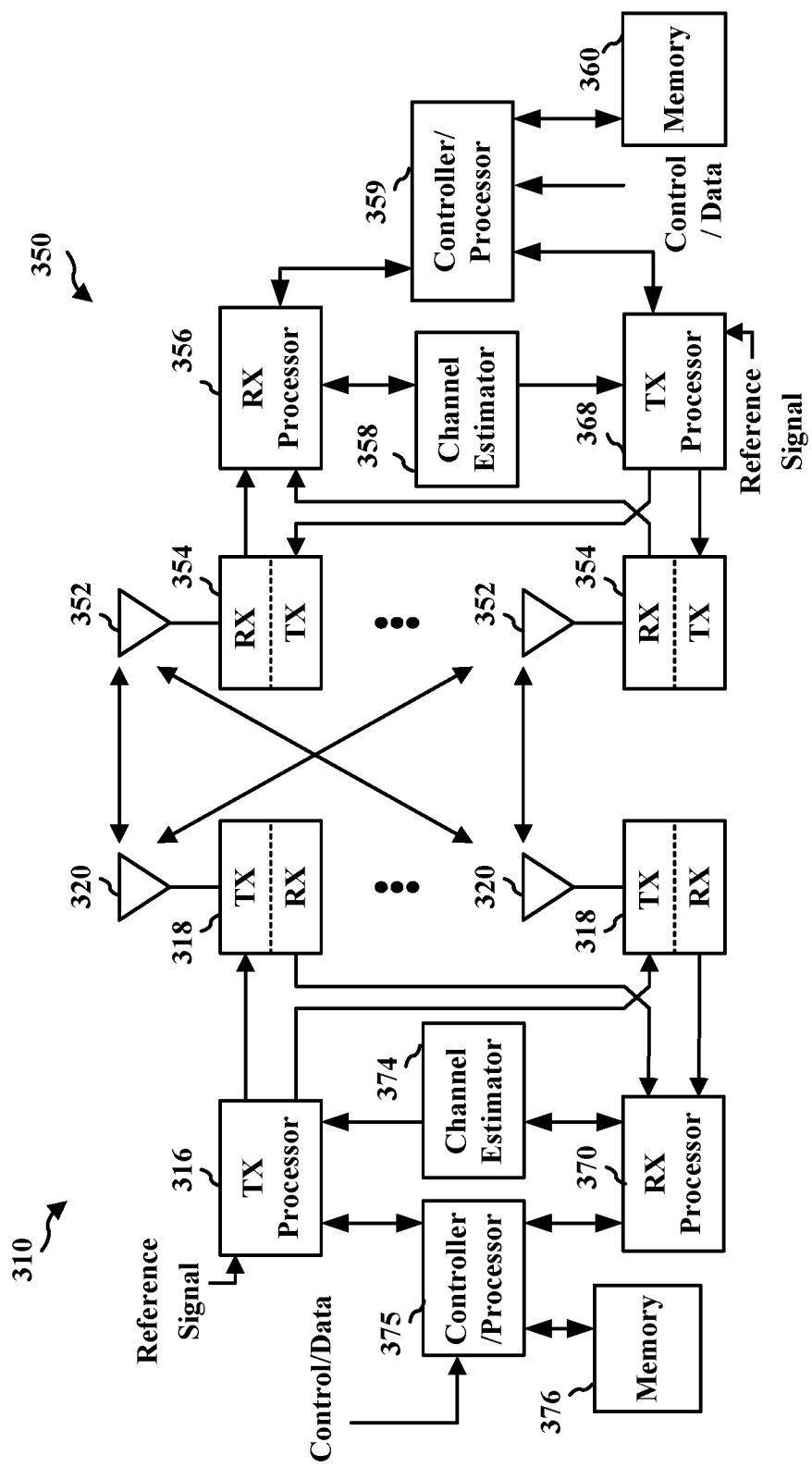
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the TCI states determination component 198 of FIG. 1.

At least one of the TX processor 316, the RX processor 370, and the controller/processor 375 may be configured to perform aspects in connection with the TCI states determination component 199 of FIG. 1.

A base station (e.g., 102/180) may transmit data using one or more transmitting (Tx) beams to a UE, and the base station may inform the UE about the Tx beam(s) it is using by indicating transmission configuration indicator (TCI) state(s) that are associated with the Tx beam(s) to the UE. Each TCI state may include information about a downlink reference signal, e.g., a channel state information reference signal (CSI-RS) or a synchronization signal block (SSB), etc. Based on the TCI state received from the base station, the UE may determine that the base station is transmitting physical downlink control channel (PDCCH) or physical downlink shared channel (PDSCH) using the same Tx beam as the corresponding downlink reference signal. In other words, each TCI state may indicate to the UE a Tx beam that the base station is going to use for transmitting the PDSCH and/or the PDCCH. The base station may indicate the TCI state(s) to the UE through downlink control information (DCI) in PDCCH when the base station is using the DCI for scheduling PDSCH.

While a base station may indicate TCI state(s) to a UE in DCI when scheduling PDSCH for the UE, there may be occasions where the DCI may not contain a TCI state field (e.g., TCI state information bits). In other words, the DCI may not indicate to the UE which Tx beam(s) is used by the base station for transmitting the PDSCH. For example, certain DCI format(s) may not include a TCI state field, such as the fallback DCI format (e.g., DCI1_0)). The base station may be configured to use the fallback DCI format when the base station is using the DCI to schedule a downlink transmission (e.g., msg2, msg4) in a contention based random access (CBRA) process, but the base station may be configured not to use the fallback DCI format for beam failure recovery (BFR). In other examples, the TCI state field may be disabled by the base station for DCI format(s) that includes a TCI state field (e.g., DCI formats DCI1_1 and DCI1_2, etc.), where a parameter for enabling the TCI state indication (e.g., the TCIpresentinDCI parameter) may not be configured/enabled for the UE in a radio resource control (RRC) configuration.

A base station may configure a scheduling offset (e.g., an offset $K_0$) for a UE between the time a downlink grant (e.g., the PDCCH) is transmitted to the UE and the time that the UE receives the corresponding PDSCH. In other words, the scheduling offset (e.g., $K_0$) may indicate to the UE a delay (e.g., in slots) between the PDCCH reception and the corresponding PDSCH reception. Based at least in part on the scheduling offset, the UE may determine whether to perform a beam switch after the UE receives new or different TCI state(s) from the base station. For example, the UE may be configured with a threshold, such as a threshold amount of time (e.g., a minimum time) for performing a beam switch or for processing received data. When the UE is unable to perform the beam switch due to insufficient time between the reception of PDCCH and the reception of the corresponding PDSCH (e.g., the scheduling offset $K_0$<the threshold), the UE may determine not to apply the received TCI state (e.g., not to perform the beam switch based on the received TCI state). The base station may also determine or configure the threshold for the UE for other purposes, such as based on the UE's processing capability (e.g., data processing speed).

When the TCI state field is presented/indicated in the DCI, the base station may transmit the PDSCH based on the indicated TCI state (e.g., in the beam associated with the TCI state) when the scheduling offset from the scheduling PDCCH to the PDSCH is larger than a threshold. On the other hand, when the TCI state is not present in the DCI (e.g., the DCI does not contain a TCI state field or the TCI state field is disabled in the DCI), and the scheduling offset is larger than the threshold, the base station may transmit the PDSCH in the same beam as the scheduling PDCCH. However, regardless whether the TCI state is presented in the DCI or not, when the scheduling offset is less than the threshold (e.g., the scheduling offset<the threshold), the base station may use a default beam to transmit the PDSCH and the UE may also expect the base station to use the default beam to transmit the PDSCH.

Figure 4:
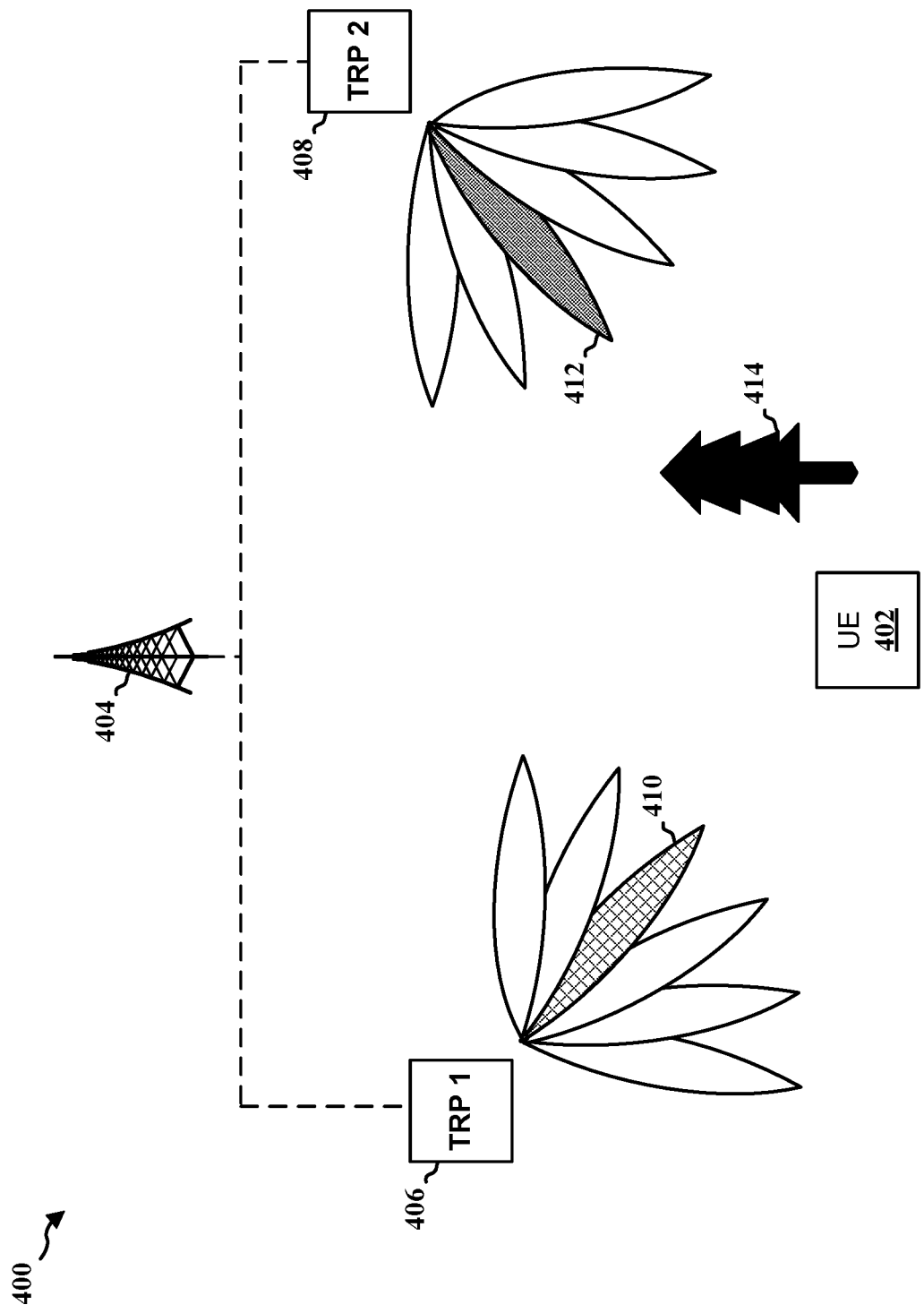
FIG. 4 is a diagram illustrating an example communication between a base station and a UE 402 involving multiple TRPs according to aspects of the present disclosure.

A base station may communicate with a UE through one or more transmit reception points (TRPs), where the UE may receive from and/or transmit to beams from multiple TRPs of a base station. FIG. 4 is a diagram 400 illustrating an example of a base station 404 communicating with a UE 402 through a first TRP 406 and a second TRP 408, where each TRP may communicate with the UE 402 using one or more beams of the TRP in accordance with various aspects of the present disclosure. For example, the base station 404 may transmit PDSCH to the UE 402 from a beam 410 of the first TRP 406 and from a beam 412 of the second TRP 408. A transmission with multiple TRPs may improve spatial diversity against blockages, as different TRPs may be in different places and/or directions. For example, as shown by diagram 400, an object 414 may obstruct the communication between the second TRP 408 and the UE 402. However, the base station 404 may still be able to communicate with the UE 402 through the first TRP 406 as the first TRP 406 may be at a different location. Although the example in diagram 400 is illustrated with two TRPs, a base station may use more than two TRPs (e.g., three TRPs, five TRPs, etc.).

A transmission from different TRPs may be scheduled by a single DCI (sDCI) from one TRP or multiple DCIs (mDCI) from different TRPs. FIG. 5A is a diagram 500A illustrating an example of a single DCI scheduling (e.g., for scheduling PDSCH transmission) in accordance with various aspects of the present disclosure. A base station 504 may schedule a PDSCH to be transmitted to a UE 502 from a first TRP 506 and a second TRP 508 of the base station 504 by transmitting a single DCI 510 to the UE 502 from one of the TRPs, such as from the first TRP 506 as illustrated by diagram 500A. The DCI 510 may include the PDSCH scheduling for both TRPs 506 and 508. For example, the DCI 510 may indicate that one portion of a PDSCH is to be transmitted from the first TRP 506 and another portion of the PDSCH is to be transmitted from the second TRP 508. In another example, the DCI 510 may indicate that a PDSCH is to be transmitted from the first TRP 506 and a repetition or a duplication of the PDSCH is to be transmitted from the second TRP 508, etc. Thus, PDSCH transmission from multiple TRPs of a base station may be based on time division multiplexing (TDM), frequency division multiplexing (FDM), space division multiplexing (SDM) or a combination thereof. For the single DCI scheduling, the base station 504 may also indicate to the UE 502 (e.g., through RRC signaling) how the scheduled PDSCH is to be multiplexed (e.g., TDM, FDM, SDM) as the DCI 510 may indicate the beams (e.g., the TCI states) for transmitting the PDSCH but may not indicate how the PDSCH is multiplexed.

Figure 5B:
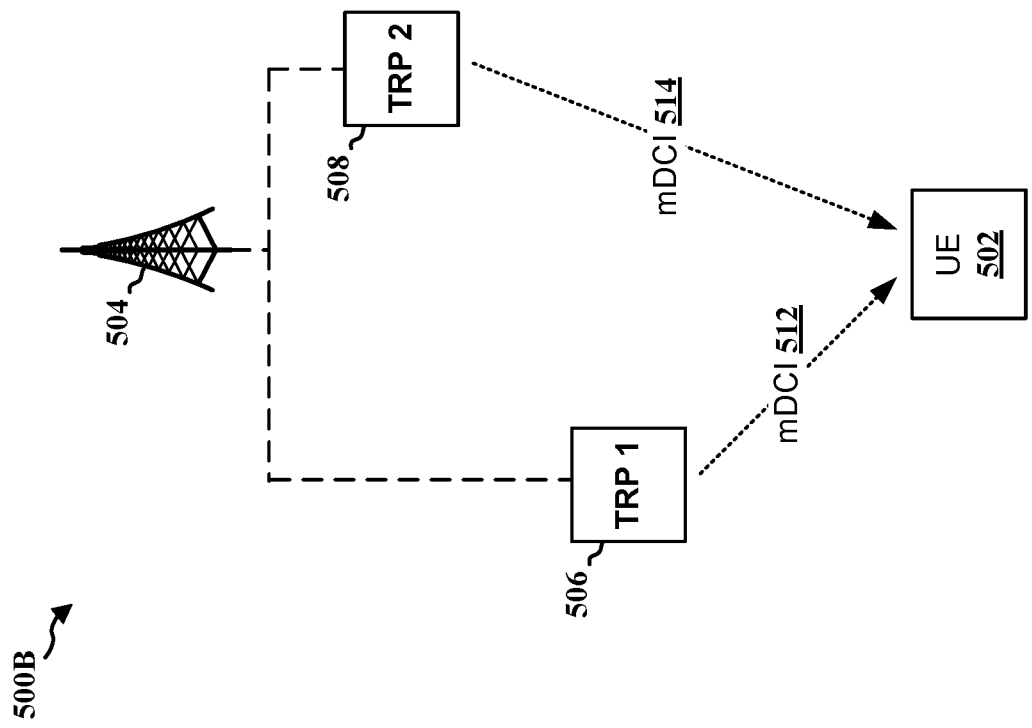
FIG. 5B is a diagram illustrating an example of a multiple DCIs scheduling according to aspects of the present disclosure.
Figure 5A:
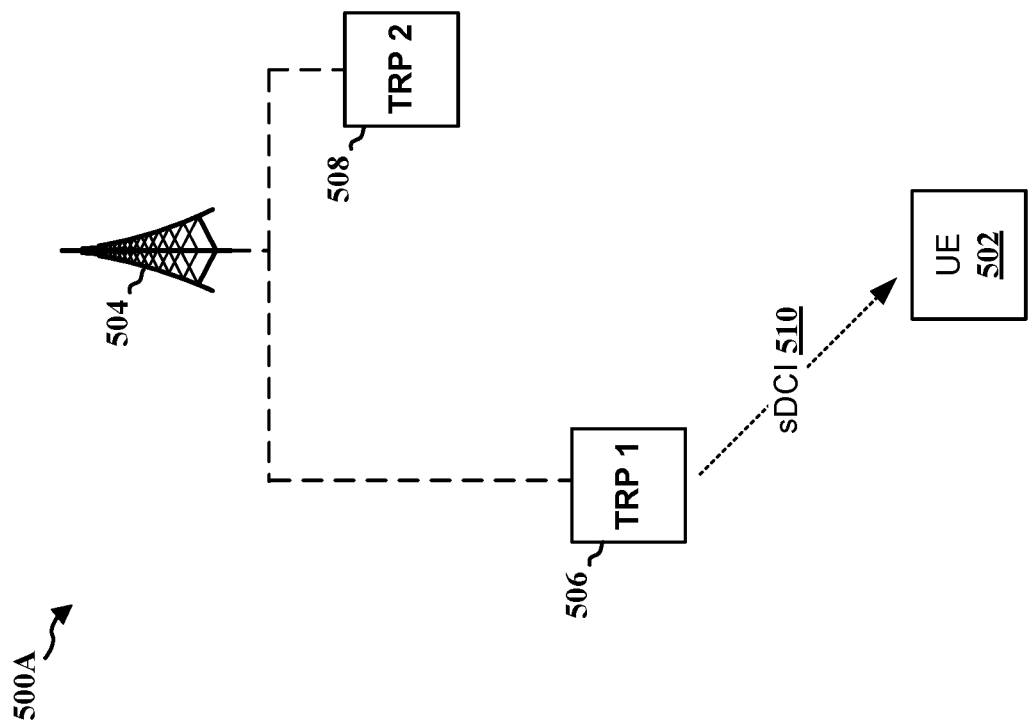
FIG. 5A is a diagram illustrating an example of a single DCI scheduling according to aspects of the present disclosure.

FIG. 5B is a diagram 500B illustrating an example of a multiple DCIs scheduling (e.g., for scheduling PDSCH transmission) in accordance with various aspects of the present disclosure. The base station 504 may also schedule a PDSCH to be transmitted to a UE 502 from the first TRP 506 and the second TRP 508 of the base station 504 by transmitting one DCI from each of the TRPs to the UE 502. For example, the first TRP 506 may transmit DCI 512 to the UE 502 that schedules a portion of the PDSCH that is to be transmitted from the first TRP 506, and the second TRP 508 may transmit DCI 514 to the UE 502 that schedules a portion (e.g., another portion) of the PDSCH that is to be transmitted from the second TRP 508. For example, the DCI 512 may indicate that a first portion of a PDSCH is to be transmitted from the first TRP 506 and the DCI 514 may indicate that a second portion of the PDSCH is to be transmitted from the second TRP 508, etc. In another example, the DCI 512 may indicate that a PDSCH is to be transmitted from the first TRP 506 and the DCI 514 may indicate that a repetition or a duplication of the PDSCH is also to be transmitted from the second TRP 508, etc. Similarly, the PDSCH transmission from multiple TRPs of the base station using multiple DCIs scheduling may be based on TDM, FDM, SDM or a combination thereof.

For the single DCI scheduling, the DCI (e.g., the DCI 510) may include a TCI codepoint that has two TCI states (e.g., a TCI state for each TRP), where these two indicated TCI states may be used for the scheduled PDSCH transmission. For the multiple DCIs scheduling, each DCI (e.g., DCI 512, 514) may indicate the transmission from the same (e.g., its corresponding) TRP. For example, if a TCI state of a PDSCH is configured with a control resource set (CORESET) pool ID, the associated PDSCH and the TCI state may be scheduled by DCI received in a CORESET using the same CORESET pool ID. The CORESET pool ID may be an indication of the corresponding TRP. As an example, when there are two TRPs as illustrated by diagrams 500A and 500B, the CORESET pool ID may include a 1-bit indication where bit zero (e.g., bit=0) may indicate the first TRP 506 and bit one (e.g., bit=1) may indicate the second TRP 508.

Figure 6:
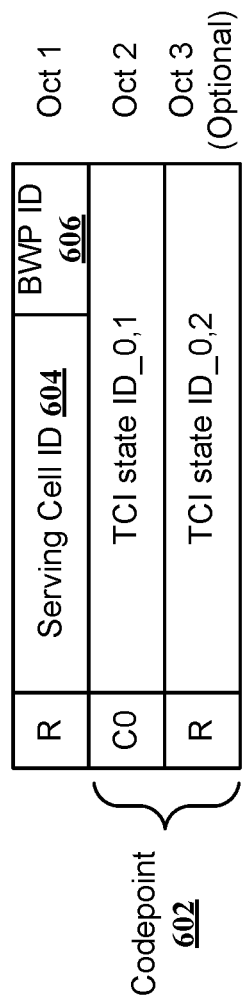
FIG. 6 is a diagram illustrating an example TCI states bitmap for single DCI scheduling according to aspects of the present disclosure.

FIG. 6 is a diagram illustrating an example TCI states bitmap 600 for a single DCI scheduling in accordance with various aspects of the present disclosure. Multiple pairs (e.g., up to 8 pairs) of TCI states may be configured for PDSCH, and each pair of TCI states may be referred to as a "codepoint" 602. Each pair (e.g., codepoint) may include two TCI states ($C_N$ and R) or a single TCI state (with the second TCI field R being reserved). A UE (e.g., 402, 502) may be configured with a TCI state list for PDSCH and/or PDCCH via RRC. For the PDCCH the network may configure the active TCI state via MAC-CE. The base station may use a serving cell ID field 604 in the TCI states bitmap 600 to indicate the identity of the serving cell for which the MAC CE applies, and the length of the serving cell field 604 may be 5 bits. The base station may also use a BWP ID field 606 in the TCI states bitmap 600 to indicate a downlink BWP for which the MAC CE applies as the codepoint of the DCI BWP indicator field, and the length of the BWP ID field 606 may be 2 bits.

Figure 7:
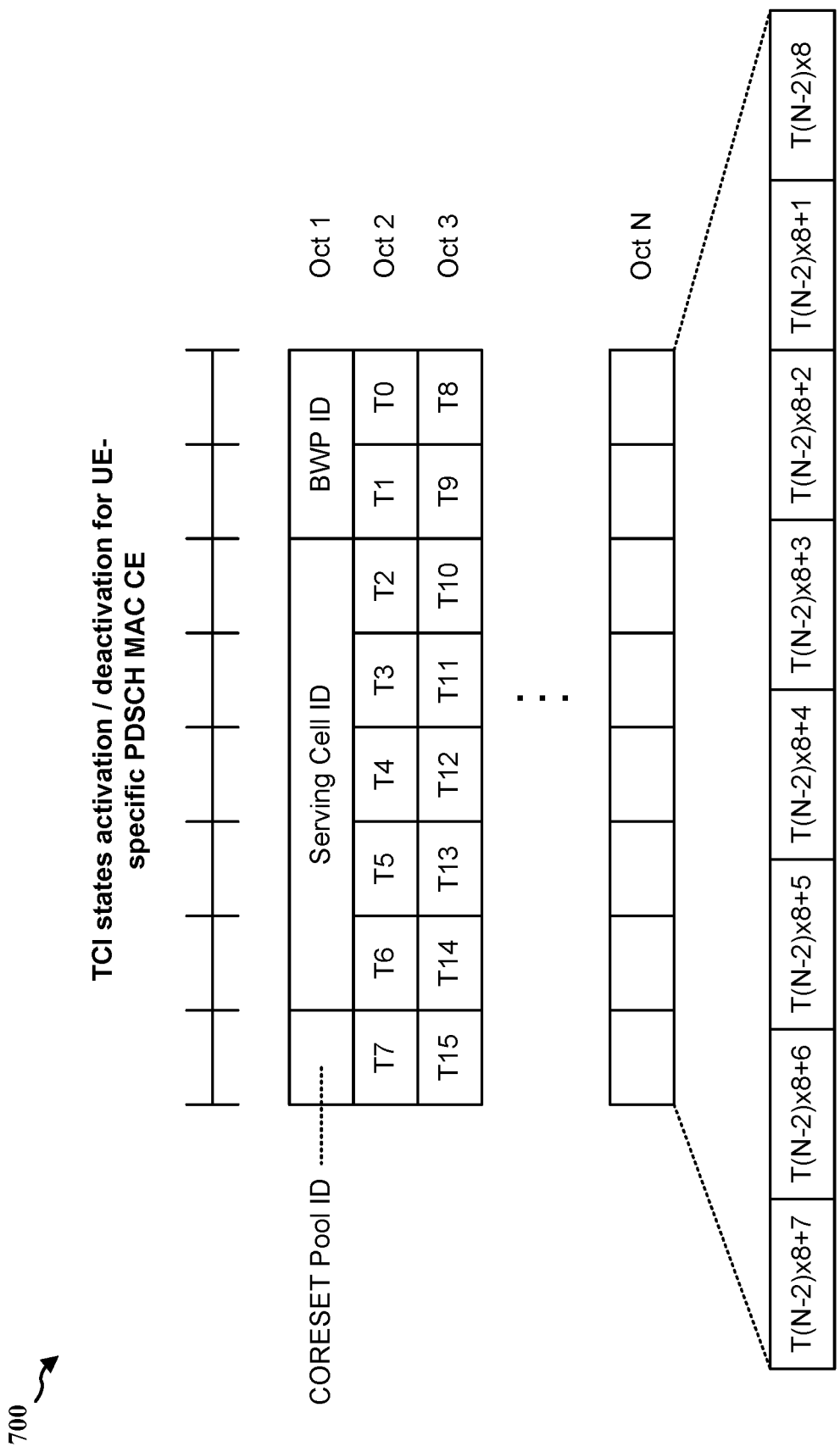
FIG. 7 is a diagram illustrating an example TCI states bitmap for multiple DCIs scheduling according to aspects of the present disclosure.

FIG. 7 is a diagram illustrating an example TCI states bitmap 700 for the multiple DCIs scheduling in accordance with various aspects of the present disclosure. A UE (e.g., 402, 502) may be configured with a parameter e.g., (e.g., the TCIpresentinDCI parameter) which may be set as "enabled" for the CORESET scheduling the PDSCH, where the TCI field may be presented in the DCI (e.g., DCI format 1_1). For example, when a bit in a specific location is set to one (1), it may indicate an activation of the TCI state mapped to the position of the bit. On the other hand, when the bit is set to zero (0), it may indicate that the TCI state mapped to the position of the bit is not activate or is deactivated. Similarly, the serving cell ID field may be used to indicate the identity of the serving cell for which the MAC CE applies, and the length of the field may be five (5) bits. The BWP ID field may be used to indicate a downlink BWP for which the MAC-CE applies as the codepoint of the DCI BWP indicator field, and the length of the BWP ID field may be two (2) bits.

For a PDSCH transmission from multiple TRPs of a base station, such as described in connection with FIGS. 5A and 5B, a UE may not have the capability to determine a TCI state for the PDSCH scheduled with DCI without the TCI state field. This may include single DCI scheduling (e.g., the sDCI in FIG. 5A) and the multiple DCIs scheduling (e.g., the mDCI in FIG. 5B) for multiple TRPs. As such, the UE and/or the base station may not be able to identify which beam(s) are to be used by each TRP of the base station for communicating with the UE. Also, in a fallback DCI case (e.g., the DCI does not contain a TCI state field), even if the TCI states may be identified, it may not convey sufficient information about the TCI states for a PDSCH from multiple TRPs. For example, the DCI may not include a number of TCI states, DMRS ports, and/or repetition related resource allocation (e.g., whether the transmission from different TRPs are TDMed, FDMed or SDMed) associated with the scheduled PDSCH. Thus, additional information may be included in the fallback DCI. In other words, the UE may not be able to determine if the DCI is scheduling a PDSCH to be transmitted from multiple TRPs or from a single TRP when the TCI state field is not presented in the DCI. For example, the DCI format 1_0 may not include the antenna ports field as in the DCI formats 1_1 or 1_2. Thus, the UE may not know how to map DMRS port to the TCI state.

Aspects presented herein may enable a UE and/or a base station to identify a TCI state for each of the multiple TRPs when the DCI does not include a TCI state. For examples, aspects presented herein may enable the UE and/or the base station to identify TCI states for different TRPs based at least in part on one of a default beam rule, the TCI state (e.g., beam) used for transmitting PDCCH, or the TCI state used for transmitting previous/last PDSCH, etc.

In one aspect of the present disclosure, for PDSCH transmission from multiple TRPs of a base station based on the single DCI scheduling or the multiple DCIs scheduling, the base station may transmit the PDSCH from multiple TRPs using default beams (e.g., at least one default beam from each TRP) when the DCI does not indicate the TCI state for the PDSCH, such as when the TCI state field is not presented in the DCI or when the TCI state field is not enabled in the DCI. Similarly, the UE may follow the default beam rule applied by the base station, such that the UE may also identify the default beams used by the multiple TRPs when the DCI does not indicate the TCI state. In other words, when the TCI state is not presented in the DCI, the base station may transmit PDSCH from multiple TRPs using a default TCI state (e.g., default beam) for each TRP, and the UE may also expect the PDSCH to be transmitted from the multiple TRPs based on the default TCI state.

Figure 8:
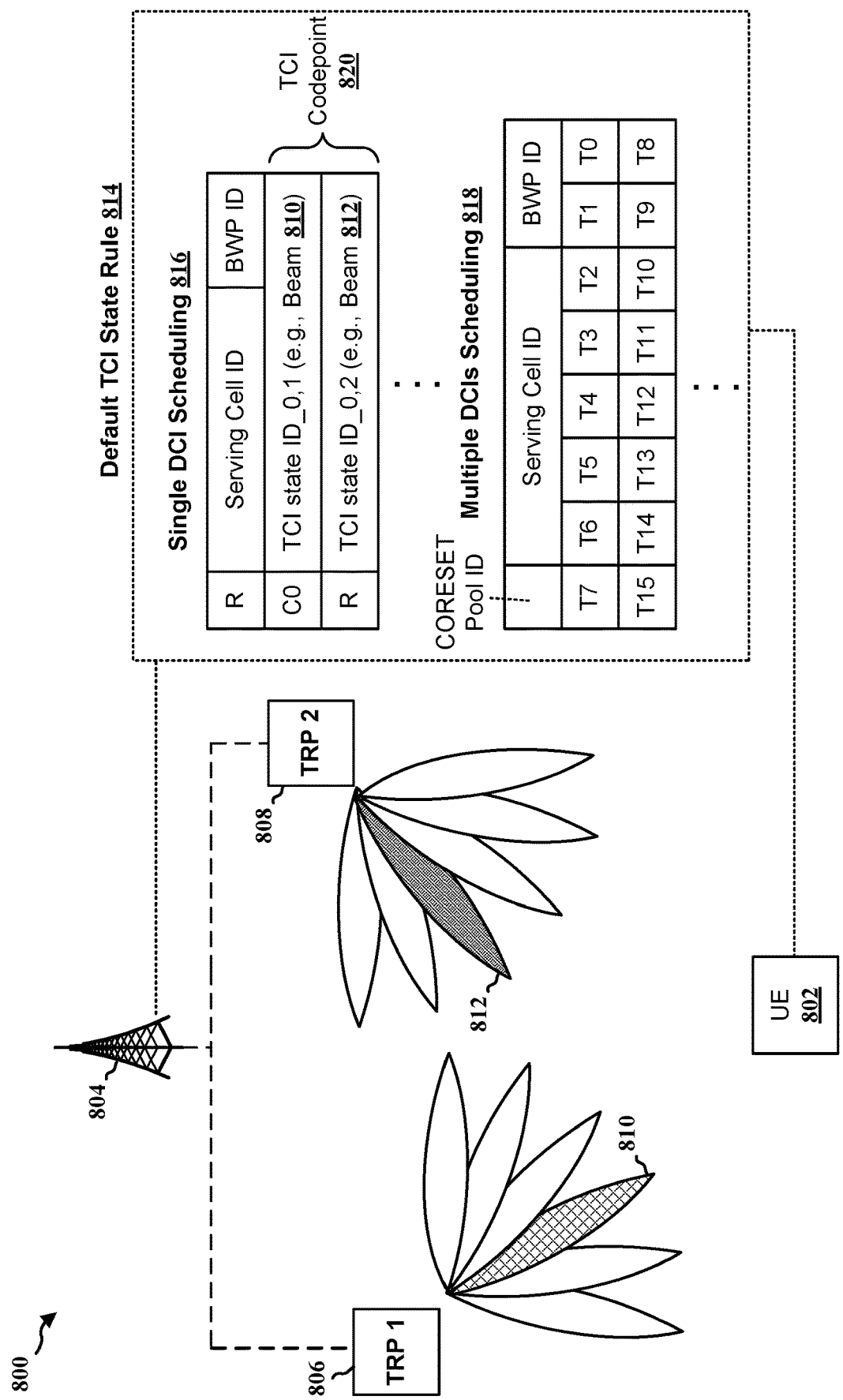
FIG. 8 is a diagram illustrating an example of PDSCH transmission from multiple TRPs using default beams according to aspects of the present disclosure.

FIG. 8 is a diagram 800 illustrating an example of PDSCH transmission from multiple TRPs based on default beams in accordance with various aspects of the present disclosure. A base station 804 may schedule a PDSCH to be transmitted to a UE 802 from a first TRP 806 and a second TRP 808 of the base station 804. When the DCI that is used for scheduling the PDSCH does not indicate the TCI state for the TRPs, both the base station 804 and the UE 802 may follow a default TCI state rule 814.

For example, for a single DCI scheduling 816, when multiple TCI states are scheduled for a PDSCH (i.e., the PDSCH is to be transmitted from multiple TRPs—one TCI state per TRP), the base station 804 may use a default TCI codepoint 820. The default codepoint 820 may include the TCI state for transmitting the PDSCH from each TRP. In other words, the default TCI codepoint 820 may indicate which beam is to be used for transmitting the PDSCH by each TRP of the base station. For example, as the base station 804 has two TRPs 806 and 808, the default TCI codepoint 820 may include two TCI states that correspond to default beams used by the two TRPs, where the first TCI state may indicate that a beam 810 is to be used for transmitting the PDSCH from the first TRP 806 and that a beam 812 is to be used for transmitting the PDSCH from the second TRP 808. In one example, when there are multiple TCI codepoints available to the base station 804, the base station 804 may select the default TCI codepoint 820 based on a TCI codepoint with lowest TCI codepoint ID and/or TCI state ID.

For multiple DCIs scheduling 818, when multiple TCI states are scheduled for a PDSCH (i.e., the PDSCH is to be transmitted from multiple TRPs—one TCI state per TRP), the base station may use one default TCI state from a CORESET pool that is associated with each TRP. Then, for each CORESET pool (e.g., identified by a CORESET pool ID), the base station may pick a TCI state corresponding to lowest COREST ID in the CORESET pool. For example, the first TRP 806 may be associated with a first CORESET pool ID (e.g., bit=0) and the second TRP 808 may be associated with a second CORESET pool ID (e.g., bit=1). When multiple DCIs that are used for scheduling PDSCH from the first TRP 806 and the second TRP 808 do not indicate the TCI state for each TRP, the base station 804 may use a first TCI state having a lowest COREST ID in the first CORE-SET pool (e.g., bit=0) at the first TRP 806 for transmitting the PDSCH, and the base station 804 may use a second TCI state having a lowest COREST ID in the second CORESET pool (e.g., bit=1) at the second TRP 808 for transmitting the PDSCH.

Based on the default TCI state rule 814, the UE 802 may also identify the beams that are to be used by the TRPs of the base station 804 for transmitting the PDSCH, and the UE 802 also determine a set of beams for receiving the PDSCH and perform a beam switch. Similarly, the PDSCH transmission from multiple TRPs of the base station 804 may be based on TDM, FDM, SDM or a combination thereof.

In another aspect of the present disclosure, for a PDSCH transmission from multiple TRPs of a base station based on the single DCI scheduling or the multiple DCIs scheduling, the base station may transmit the PDSCH from multiple TRPs based on the TCI state that is used for transmitting the corresponding/scheduling PDCCH when the DCI does not indicate the TCI state for the PDSCH, such as when the TCI state field is not presented in the DCI or when the TCI state field is not enabled in the DCI. Similarly, the UE may follow the same rule as the base station, where the UE may determine that a PDSCH is to be transmitted from multiple TRPs using at least one beam (e.g., from one of the TRPs) that transmits the PDCCH scheduling the PDSCH when the DCI does not indicate the TCI state. In other words, when the TCI state is not presented in the DCI, the base station may transmit PDSCH from multiple TRPs using the same beam(s) for transmitting PDCCH, and the UE may also expect the PDSCH to be transmitted from the multiple TRPs based on the beams used by the base station for transmitting the PDCCH.

Figure 9:
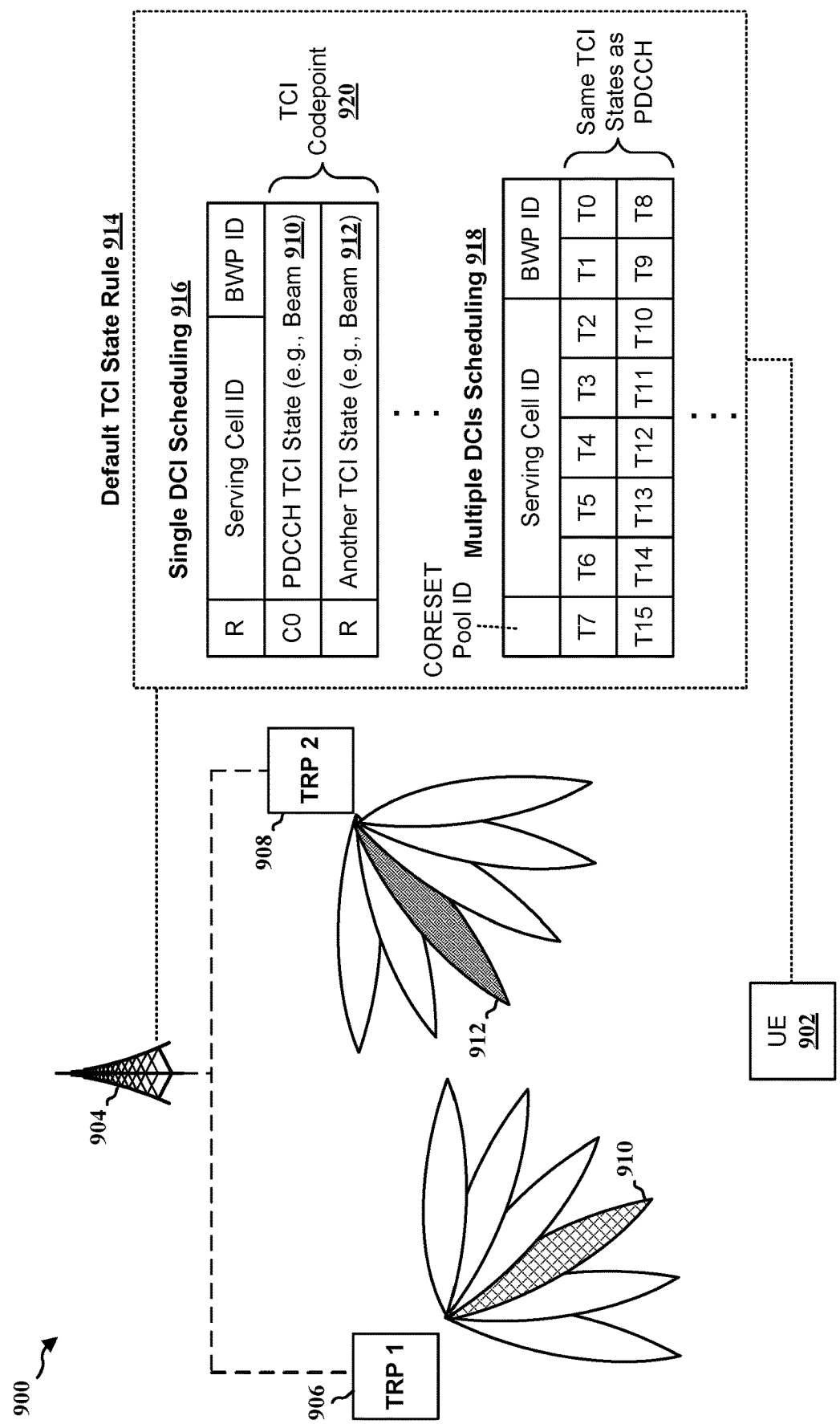
FIG. 9 is a diagram illustrating an example of PDSCH transmission from multiple TRPs based on beams used for transmitting PDCCH according to aspects of the present disclosure.

FIG. 9 is a diagram 900 illustrating an example of PDSCH transmission from multiple TRPs based on beams used for transmitting PDCCH. A base station 904 may schedule a PDSCH to be transmitted to a UE 902 from a first TRP 906 and a second TRP 908 of the base station 904 in accordance with various aspects of the present disclosure. When the DCI that is used for scheduling the PDSCH does not indicate the TCI state for the TRPs, both the base station 904 and the UE 902 may follow a default TCI state rule 914.

For example, for a single DCI scheduling 916, when multiple TCI states are scheduled for a PDSCH (i.e., the PDSCH is to be transmitted from multiple TRPs—one TCI state per TRP), the base station 904 may use a TCI codepoint 920 that contains the TCI state of a PDCCH (e.g., the PDCCH that schedules the PDSCH) and another different TCI state (e.g., not used for transmitting the PDCCH). In other words, as each TCI codepoint may include one or two TCI states, the base station 904 may look for a codepoint that include at least two TCI state (e.g., one TCI state for each TRP), where at least one of the two TCI state is used for transmitting the corresponding PDCCH. If there are multiple codepoints that qualify the above condition (e.g., it contains TCI state for PDCCH and another TCI state), then the base station 904 may use the codepoint with lowest TCI state ID and/or TCI codepoint ID. For example, the base station may transmit a PDCCH from a beam 910 of the first TRP 906 to the UE 902. When the DCI scheduling the PDSCH does not include the TCI state, the base station 904 may select a TCI codepoint 920 that includes the TCI state for transmitting the PDCCH (e.g., the TCI state associated with the beam 910) and another TCI state, which may be associated a beam 912 of the second TRP 908. If there are multiple codepoints that qualify the condition, then the TCI codepoint 920 is selected from the codepoint with lowest TCI state ID and/or TCI codepoint ID.

For multiple DCIs scheduling 918, when multiple TCI states are scheduled for a PDSCH (i.e., the PDSCH is to be transmitted from multiple TRPs—one TCI state per TRP), the base station may transmit the PDSCH using the beams used for sending the multiple DCIs (e.g., the PDCCHs). For example, the first TRP 906 of the base station 904 may transmit a first PDCCH (e.g., first DCI) to the UE 902 using a beam 910 for scheduling a PDSCH, and the second TRP 908 of the base station 904 may transmit a second PDCCH (e.g., second DCI) to the UE 902 using a beam 912 for scheduling the PDSCH (or a different portion or repetition of the PDSCH depending on the multiplexing associated with the PDSCH). Thus, when the multiple DCIs scheduling the PDSCH do not include the TCI state for transmitting the PDSCH, the base station 904 may transmit the PDSCH to the UE 902 using the beam 910 of the first TRP 906 and the beam 912 of the second TRP 908.

Based on the default TCI state rule 914, the UE 902 may identify the beams that are to be used by the TRPs of the base station 904 for transmitting the PDSCH, and the UE 902 may also determine a set of beams for receiving the PDSCH and perform a beam switch. Similarly, the PDSCH transmission from multiple TRPs of the base station 904 may be based on TDM, FDM, SDM or a combination thereof.

In another aspect of the present disclosure, for PDSCH transmission from multiple TRPs of a base station based on the single DCI scheduling or the multiple DCIs scheduling, the base station may transmit the PDSCH from multiple TRPs based on the TCI states that are used for transmitting a previous or last PDSCH in a same bandwidth part (BWP) and/or component carrier (CC) when the DCI does not indicate the TCI state for the PDSCH, such as when the TCI state field is not presented in the DCI or when the TCI state field is not enabled in the DCI. Similarly, the UE may follow the same rule as the base station, where the UE may determine that the PDSCH is to be transmitted from multiple TRPs using the beams that transmit the previous or last PDSCH (e.g., at least one beam from each TRP) when the DCI does not indicate the TCI state. In other words, when the TCI state is not presented in the DCI, the base station may transmit PDSCH using the beams from last PDSCH scheduling in the same BWP/CC, and the UE may also expect the PDSCH to be transmitted from the multiple TRPs based on the beams used by the base station for transmitting last PDSCH in the same BWP/CC.

Figure 10:
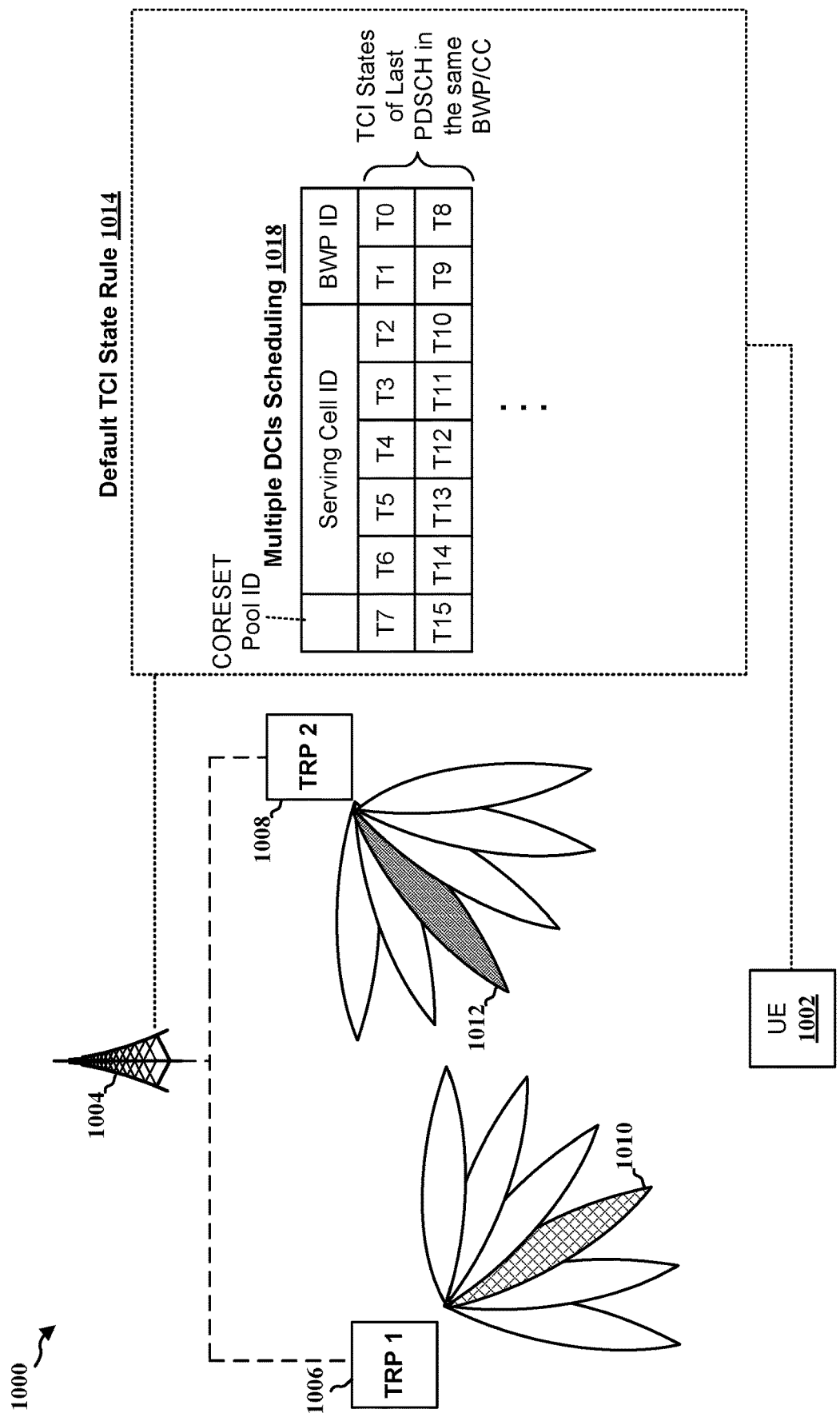
FIG. 10 is a diagram illustrating an example of PDSCH transmission from multiple TRPs based on beams used for transmitting last/previous PDSCH in the same BWP and/or CC according to aspects of the present disclosure.

FIG. 10 is a diagram 1000 illustrating an example of PDSCH transmission from multiple TRPs based on beams used for transmitting last/previous PDSCH in the same BWP and/or CC in accordance with various aspects of the present disclosure. A base station 1004 may schedule a PDSCH to be transmitted to a UE 1002 from a first TRP 1006 and a second TRP 1008 of the base station 1004. When the DCI that is used for scheduling the PDSCH does not indicate the TCI state for the TRPs, both the base station 1004 and the UE 1002 may follow a default TCI state rule 1014, where the base station 1004 may transmit the PDSCH using the same beams for transmitting the last/previous PDSCH.

For example, for multiple DCIs scheduling 1018, when multiple TCI states are scheduled for a PDSCH (i.e., the PDSCH is to be transmitted from multiple TRPs—one TCI state per TRP), the base station may transmit the PDSCH using the beams used for sending the last PDSCH when both PDSCH are transmitted in the same BWP and/or CC. For example, the first TRP 1006 of the base station 1004 may transmit a first PDSCH to the UE 1002 using the beam 1010, and the second TRP 1008 of the base station 1004 may also transmit the first PDSCH (or a different portion or repetition of the first PDSCH depending on the multiplexing associated with the PDSCH) to the UE 1002 using the beam 1012. Thus, when the multiple DCIs scheduling subsequent PDSCH in the same BWP and/or CC do not include the TCI state for transmitting the PDSCH, the base station 1004 may transmit the subsequent PDSCH to the UE 1002 using the beam 1010 of the first TRP 1006 and the beam 1012 of the second TRP 1008. However, if there is no such last/previous PDSCH in the BWP and/or CC, then the base station 1004 may use or switch to single TRP transmission.

Based on the default TCI state rule 1014, the UE 1002 may also identify the beams that are to be used by the TRPs of the base station 1004 for transmitting the PDSCH, and the UE 1002 may determine a set of beams for receiving the PDSCH and perform a beam switch. Similarly, the PDSCH transmission from multiple TRPs of the base station 1004 may be based on TDM, FDM, SDM or a combination thereof.

If a single TCI is scheduled for the PDSCH (e.g., the PDSCH is to be transmitted from a TRP), the base station 1004 and the UE 1002 may apply the default beam rule for the single TRP discussed above. For example, when the TCI state is not present in the DCI, and the scheduling offset is larger than the threshold, the base station may transmit the PDSCH in the same beam as the scheduling PDCCH. When the scheduling offset is not larger than the threshold (e.g., the scheduling offset<the threshold), the base station may use a default beam to transmit the PDSCH.

For aspects described in connection with FIGS. 8 to 10, the UE (e.g., 802, 902, 1002) may identify how many TCI states are scheduled for the PDSCH based on an additional field in DCI, or the number of TCI states may be configured for the UE or precoded at the UE. In addition, the UE and/or the base station may also determine the TCI state for the multiple TRPs based at least in part on a time difference between receiving the single DCI or multiple DCIs and receiving the PDSCH. For example, when the scheduling offset between receiving the single DCI or multiple DCIs and receiving the PDSCH is not greater than a threshold, the UE and/or the base station may determine not to apply the TCI state rules that are described in connection with FIGS. 8 to 10.

In another aspect of the present disclosure, a base station may transmit the single DCI or the multiple DCIs to the UE using a fallback DCI format (e.g., the DCI does not contain a TCI state field). In such fallback DCI case(s), the base station may use the reserved bits in the fallback DCI format to indicate one or more additional information related to multiple TRPs transmission. In one example, the DCI may add a field to indicate the number of TCI states associated with a scheduled PDSCH. For example, bit zero (e.g., bit=0) may indicate that the PDSCH is to be transmitted with one TCI state (e.g., from one TRP), and bit one (e.g., bit=1) may indicate that the PDSCH is to be transmitted with two or multiple TCI states (e.g., from two TRPs), etc. Based on the number of TCI states, the UE may determine whether to apply the default beam rule(s) associated with a single TCI (e.g., the PDSCH is to be transmitted from one TRP) or the default beam rule(s) associated with multiple TCIs (e.g., the PDSCH is to be transmitted from multiple TRPs), e.g., as described in connection with FIGS. 8 to 10. The UE may then determine a beam or a set of beams for receiving the PDSCH accordingly. In another example, the DCI (e.g., the fallback DCI) may include an antenna ports field, such as a field for indicating DMRS antenna ports that are to be used for transmitting the PDSCH (e.g., that are associated with the transmitting beams). In other words, the additional antenna ports field may provide mapping information for antenna ports and the corresponding beams (e.g., two ports for two beams). In another example, the DCI may include a field for indicating repetition-related resource allocation, such as indicating whether the PDSCH is TDMed, FDMed or SDMed, or whether the PDSCH from a TRP is a repetition or a duplication, etc.

Figure 11:
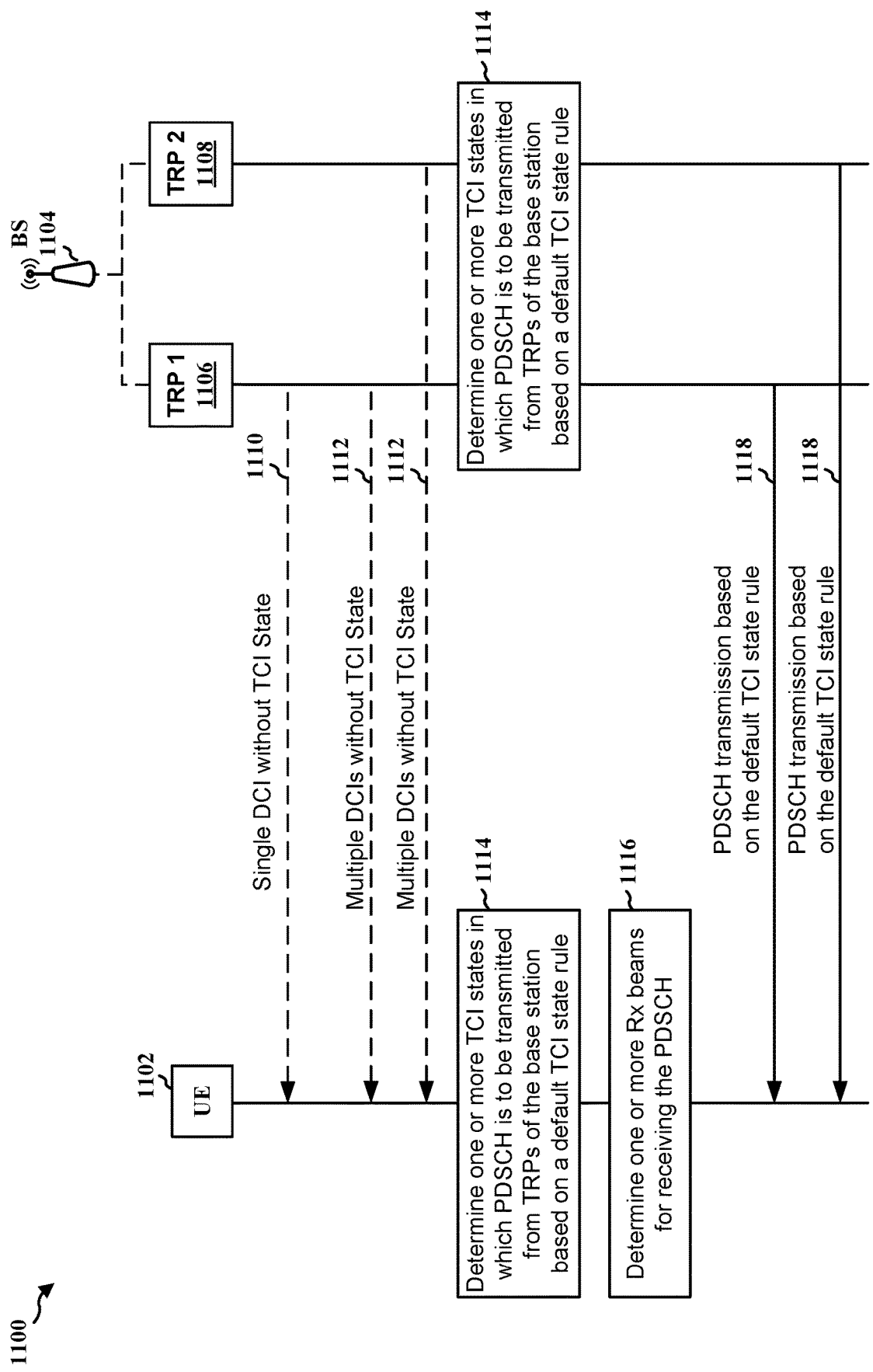
FIG. 11 is a communication flow between a UE and a base station according to aspects of the present disclosure.

FIG. 11 is a communication flow 1100 according to aspects of the present disclosure. For single DCI scheduling, as shown at 1110, the base station 1104 may transmit a single DCI without TCI state from one TRP (e.g., a first TRP 1106 or a second TRP 1108) of the base station 1104 that schedules how a PDSCH is to be transmitted from a first TRP 1106 and a second TRP 1108 of the base station 1104 to a UE 1102 (e.g., a PDSCH with two or more TCI states). For multiple DCIs scheduling, as shown at 1112, the base station 1104 may transmit multiple DCIs without TCI state to the UE 1102 from multiple TRPs, where each TRP (e.g., 1106, 1108) may transmit DCI to the UE 1102 that schedules how the PDSCH or a portion/repetition of the PDSCH is to be transmitted from that TRP. For example, the first TRP 1106 may transmit a first DCI that schedules how a PDSCH or a portion of the PDSCH is to be transmitted from the first TRP 1106 to the UE 1102, and the second TRP 1106 may transmit a second DCI that schedules how the PDSCH or a portion (e.g., another portion) of the PDSCH is to be transmitted from the second TRP 1108 to the UE 1102, etc.

At 1114, both the UE 1102 and the base station 1104 may determine one or more TCI states in which the PDSCH is to be transmitted from the first TRP 1106 and the second TRP 1108 of the base station 1104 based on a default TCI state rule, such as described in connection with FIGS. 8 to 10.

In one example, as described in connection with FIG. 8, based on a default TCI state rule (e.g., 814), the base station 1104 may transmit the PDSCH from the first TRP 1106 and the second TRP 1108 using default beams (e.g., at least one default beam from each TRP). Similarly, the UE 1102 may follow the same default TCI state rule (e.g., 814) as the base station 1104, such that the UE 1102 may identify the default beams that are to be used by the first TRP 1106 and the second TRP 1108 for transmitting the PDSCH. For example, in the single DCI scheduling case, when two TCIs are scheduled for the PDSCH, the base station 1104 may use a default TCI codepoint for transmitting the PDSCH, where the TCI codepoint may contain two different TCI states with lowest ID. In another example, for the multiple DCIs scheduling case, when two TCIs are scheduled for the PDSCH, the base station 1104 may use one default TCI state from each CORESET pool to transmit the PDSCH from each of the TRP (e.g., 1106 and 1108). For each CORESET pool ID, the base station and the UE may pick the TCI state corresponding to lowest COREST ID in each CORESET pool.

In another example, as described in connection with FIG. 9, based on a default TCI state rule (e.g., 914), the base station 1104 may transmit the PDSCH from the first TRP 1106 and the second TRP 1108 based on the TCI state(s) that are used for transmitting the corresponding/scheduling PDCCH. Similarly, the UE 1102 may follow the same default TCI state rule (e.g., 914) as the base station 1104, where the UE 1102 may determine that the PDSCH is to be transmitted from the first TRP 1106 and the second TRP 1108 using at least one beam that transmits the PDCCH scheduling the PDSCH. For example, in the single DCI scheduling case, when two TCIs are scheduled for the PDSCH, the base station 1104 and the UE 1102 may use a TCI codepoint containing the TCI state of the PDCCH and another different TCI state. If multiple codepoints qualify the above condition, the base station 1104 and the UE 1102 may use the codepoint with a lowest ID. In another example, for the multiple DCIs scheduling case, the PDSCH beams are the same set of beams that are used by the first TRP 1106 and the second TRP 1108 for sending the multiple DCIs.

In another example, as described in connection with FIG. 10, based on a default TCI state rule (e.g., 1014), the base station 1104 may transmit the PDSCH from the first TRP 1106 and the second TRP 1108 based on the TCI states that are used for transmitting a previous or last PDSCH in a same BWP and/or CC. Similarly, the UE 1102 may follow the same default TCI state rule (e.g., 1014) as the base station 1104, where the UE 1102 may determine that the PDSCH is to be transmitted from the first TRP 1106 and the second TRP 1108 using the beams that transmit the previous or last PDSCH (e.g., at least one beam from each TRP). For example, if two beams (e.g., two TCI states) are configured for transmitting the PDSCH, then the base station 1104 may use the same two beams for transmitting a previous PDSCH in the CC and/or BWP. If there is no such previous PDSCH in the BWP and/or CC, then the base station 1104 may transmit the PDSCH use single TRP transmission (e.g., from one of the TRPs 1106 or 1108.

At 1116, the UE 1102 may determine one or more receiving beams for receiving the PDSCH based on knowing which beams are used by the first TRP 1106 and the second TRP 1108 for transmitting the PDSCH. Based on the determination, the UE may perform a beam switch if the UE is able to do so (e.g., if there is sufficient scheduling offset to perform the beam switch).

At 1118, the base station 1104 may transmit the PDSCH from the first TRP 1106 and the second TRP 1108 based on the default TCI state rule (e.g., 814, 914 and/or 1014) followed by the base station 1104 and the UE 1102.

Figure 12:
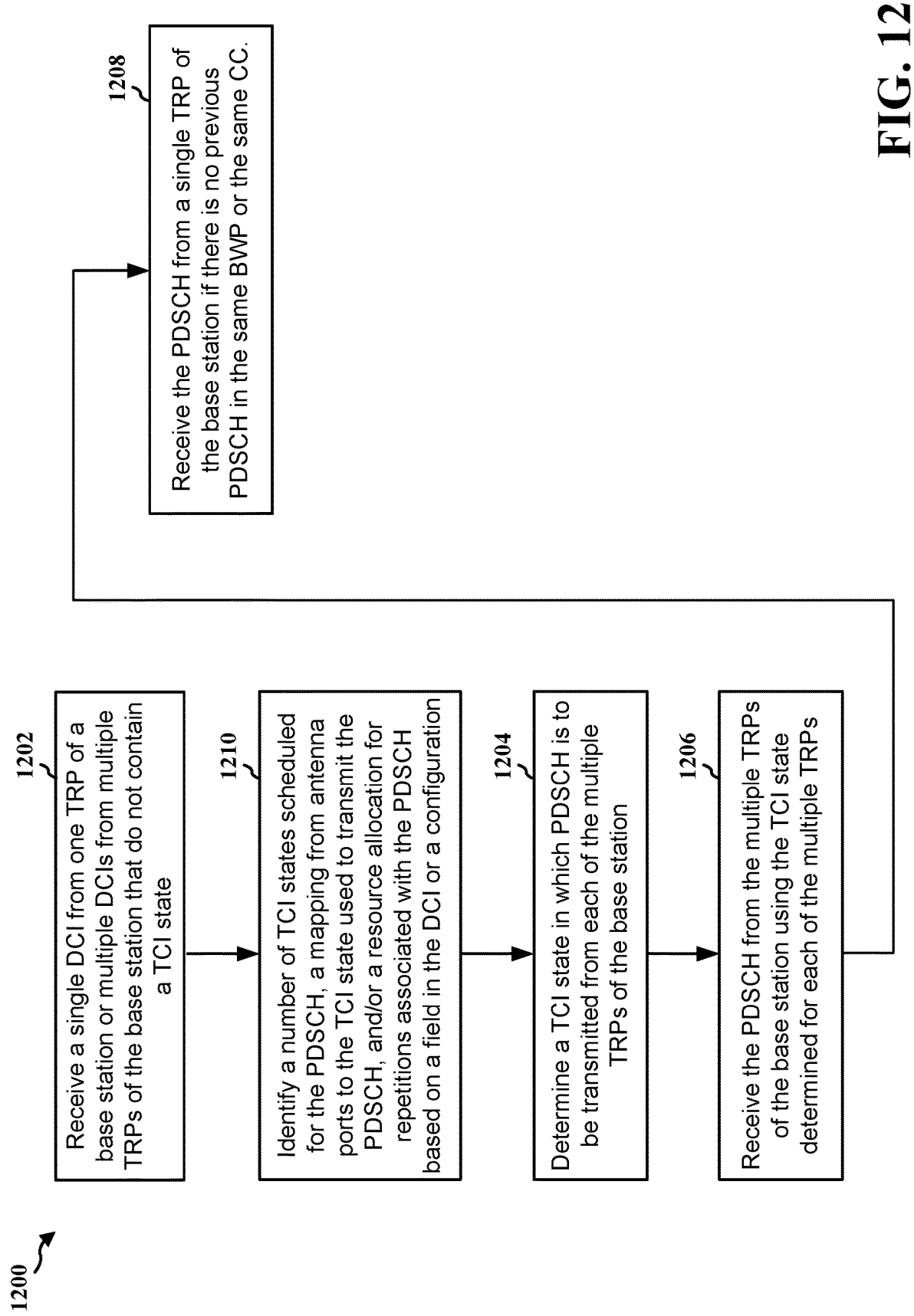
FIG. 12 is a flowchart of a method of wireless communication.

FIG. 12 is a flowchart of a method 1200 of wireless communication. The method may be performed by a UE or a component of a UE (e.g., the UE 104, 350, 402, 502, 802, 902, 1002, 1102; the apparatus 1302; a processing system, which may include the memory 360 and which may be the entire UE 350 or a component of the UE 350, such as the TX processor 368, the RX processor 356, and/or the controller/processor 359). The method may enable the UE to identify a TCI state for PDSCH transmitting from multiple TRPs of a base station when the DCI scheduling the PDSCH does not include a TCI state.

At 1202, the UE may receive a single DCI from one TRP of a base station or multiple DCIs from multiple TRPs of the base station that do not contain a TCI state, such as described in connection with FIGS. 8 to 11. For example, at 1110 or at 1112 of FIG. 11, the UE 1102 may receive a single DCI from a TRP or multiple DCIs from multiple TRPs (e.g., 1106, 1108) of the base station 1104 that do not contain a TCI state. The reception of the single DCI or the multiple DCIs may be performed by, e.g., the DCI process component 1340 and/or the reception component 1330 of the apparatus 1302 in FIG. 13.

In one example, the UE may identify a number of TCI states scheduled for the PDSCH based on a field in the DCI or a configuration. In another example, the UE may identify a mapping from antenna ports to the TCI state used to transmit the PDSCH based on a field in the DCI or a configuration. In another example, the UE may identify a resource allocation for repetitions associated with the PDSCH based on a field in the DCI or a configuration.

In one example, the UE may receive the single DCI or the multiple DCI in a fallback DCI format. The fallback DCI format may include additional information that identifies at least one of a number of TCI states associated with the PDSCH, an antenna port field associated with the PDSCH, or resource allocation for repetition associated with the PDSCH.

At 1204, the UE may determine a TCI state in which PDSCH is to be transmitted from each of the multiple TRPs of the base station, such as described in connection with FIGS. 8 to 11. For example, at 1114 of FIG. 11, the UE 1102 may determine one or more TCI states in which the PDSCH is to be transmitted from the first TRP 1106 and the second TRP 1108 of the base station 1104 based on a default TCI state rule. In some examples, the UE may also determine the TCI state based on a time difference between receiving the single DCI or multiple DCIs and receiving the PDSCH. The determination of the TCI state may be performed by, e.g., the TCI state determination component 1342 of the apparatus 1302 in FIG. 13.

In one example, as described in connection with FIG. 8, if the UE receives a single DCI from a single TRP of the base station scheduling the PDSCH from the multiple TRPs, the UE may determine the TCI state for each of the multiple TRPs based on a default TCI codepoint if two or more TCI states are scheduled for the PDSCH. For example, the default TCI codepoint may include two different TCI states with lowest TCI state IDs from a set of TCI states. If the UE receives the multiple DCIs from the multiple TRPs of the base station, the UE may determine the TCI state for each of the multiple TRPs based on a default TCI state associated with each of the multiple TRPs when two or more TCI states are scheduled for the PDSCH. For example, each of the multiple TRPs may be associated with a CORESET pool that includes multiple TCI states, and the default TCI state for each of the multiple TRPs may be selected from the CORESET pool corresponding to each of the multiple TRPs. For example, the default TCI state may correspond to a CORESET with a lowest CORESET ID in the CORESET pool.

In another example, as described in connection with FIG. 9, the UE may determine the TCI state based on one or more TCI states used for receiving PDCCH. For example, if the UE receives the single DCI from a single TRP of the base station, the UE may determine the TCI state for each of the multiple TRPs based on a TCI codepoint that indicates a first TCI state used for the PDCCH comprising the DCI and a second TCI state that is not used by the base station for transmitting the PDCCH. In one example, the first TCI state may be for the TRP from which the single DCI is received, and the second TCI state may be for a second TRP. In another example, the TCI codepoint may have a lowest codepoint ID among multiple TCI codepoints. On the other hand, if the UE receives the multiple DCIs from the multiple TRPs of the base station, then the TCI state for each of the multiple TRPs may correspond to the TCI state used for receiving the PDCCH includes DCI from a respective TRP.

In another example, as described in connection with FIG. 10, the UE may determine the TCI state for each of the multiple TRPs based on TCI states for a previous PDSCH in a same BWP or in a same CC. At 1208, if there is no previous PDSCH in the same BWP or the same CC, the UE may receive the PDSCH from a single TRP of the base station.

At 1210, in some examples, the UE may identify a number of TCI states scheduled for the PDSCH based on a field in the DCI or a configuration. In another example, the UE may identify a mapping from antenna ports to the TCI state used to transmit the PDSCH based on a field in the DCI or a configuration. In another example, the UE may identify a resource allocation for repetitions associated with the PDSCH based on a field in the DCI or a configuration.

At 1206, the UE may receive the PDSCH from the multiple TRPs of the base station using the TCI state determined for each of the multiple TRPs Based on the determined TCI state, such as described in connection with FIGS. 8 to 11. For example, at 1118 of FIG. 11, the UE 1102 may receive the PDSCH from the multiple TRPs of the base station based on the default TCI state rule.

Figure 13:
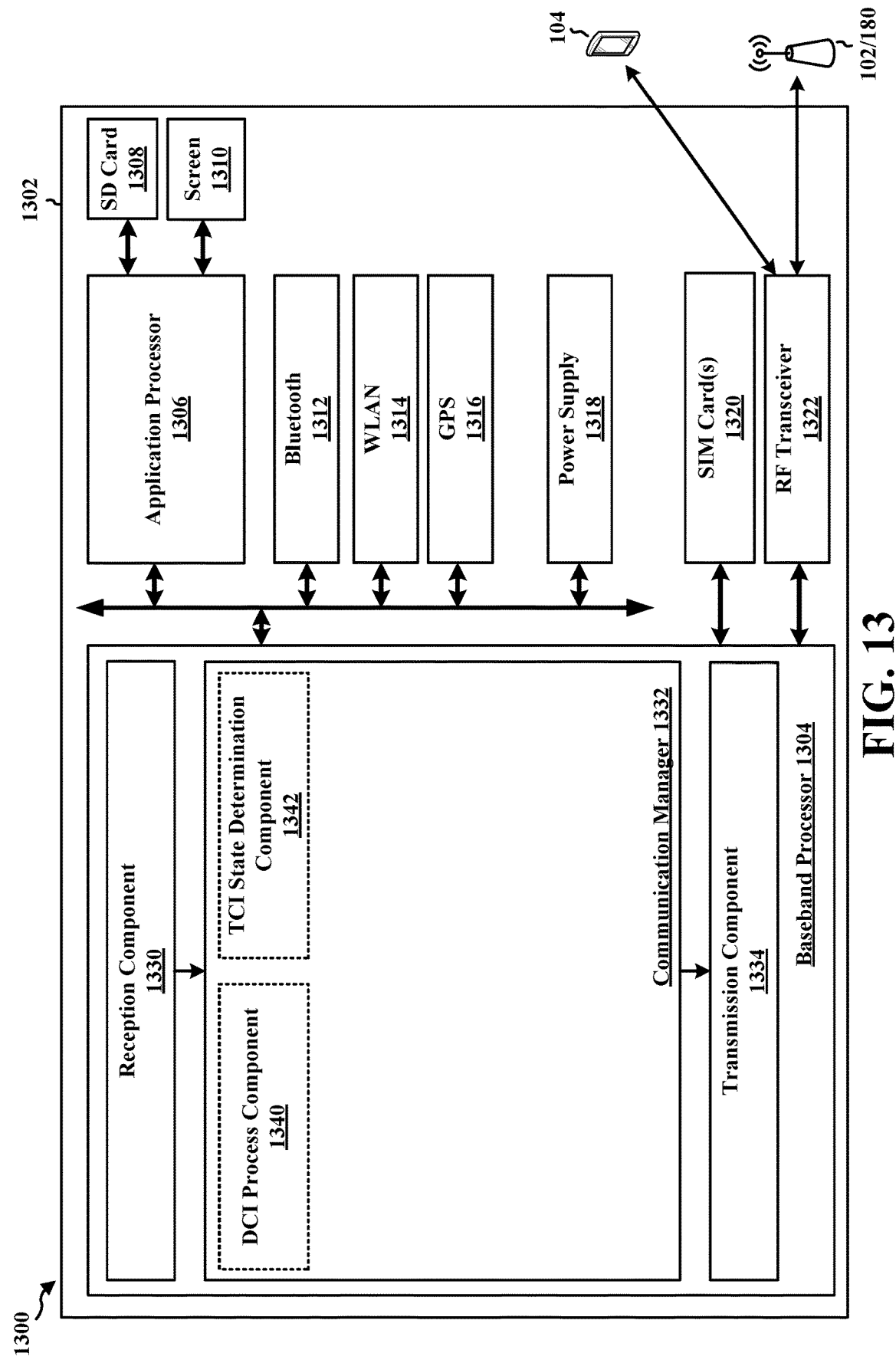
FIG. 13 is a diagram illustrating an example of a hardware implementation for an example apparatus.

FIG. 13 is a diagram 1300 illustrating an example of a hardware implementation for an apparatus 1302. The apparatus 1302 is a UE and includes a baseband processor 1304 (also referred to as a modem) coupled to a RF transceiver 1322 and one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The baseband processor 1304 communicates through the RF transceiver 1322 with the UE 104 and/or BS 102/180. The baseband processor 1304 may include a computer-readable medium/memory. The baseband processor 1304 is responsible for general processing, including the execution of software stored on the computer-readable medium/memory. The software, when executed by the baseband processor 1304, causes the baseband processor 1304 to perform the various functions described supra. The computer-readable medium/memory may also be used for storing data that is manipulated by the baseband processor 1304 when executing software. The baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband processor 1304. The baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the additional modules of the apparatus 1302.

The communication manager 1332 includes a DCI process component 1340 that is configured to receive a single DCI from one TRP of a base station or multiple DCIs from multiple TRPs of the base station that do not contain a TCI state, e.g., as described in connection with 1202 of FIG. 12. The communication manager 1332 further includes a TCI state determination component 1342 that is configured to determine a TCI state in which PDSCH is to be transmitted from each of the multiple TRPs of the base station, e.g., as described in connection with 1204 of FIG. 12.

The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband processor 1304, includes means for receiving a single DCI from one TRP of a base station or multiple DCIs from multiple TRPs of the base station that do not contain a TCI state (e.g., the DCI process component 1340 and/or the reception component 1330). The apparatus 1302 includes means for determine a TCI state in which PDSCH is to be transmitted from each of the multiple TRPs of the base station. The apparatus 1302 includes means for receiving the PDSCH from the multiple TRPs of the base station using the TCI state determined for each of the multiple TRPs.

In one configuration, the apparatus 1302 may include means for identifying a number of TCI states scheduled for the PDSCH based on a field in the DCI or a configuration. In another configuration, the apparatus 1302 may include means for identifying a mapping from antenna ports to the TCI state used to transmit the PDSCH based on a field in the DCI or a configuration. In another configuration, the apparatus 1302 may include means for identifying a resource allocation for repetitions associated with the PDSCH based on a field in the DCI or a configuration.

In one configuration, the apparatus 1302 may receive the single DCI or the multiple DCI in a fallback DCI format. In such configuration, the fallback DCI format may include additional information that identifies at least one of a number of TCI states associated with the PDSCH, an antenna port field associated with the PDSCH, or resource allocation for repetition associated with the PDSCH.

In one configuration, the apparatus 1302 may also include means for determining the TCI state based on a time difference between receiving the single DCI or multiple DCIs and receiving the PDSCH.

In one configuration, if the apparatus 1302 includes means for receiving a single DCI from a single TRP of the base station scheduling the PDSCH from the multiple TRPs, the apparatus 1302 may include means for determining the TCI state for each of the multiple TRPs based on a default TCI codepoint if two or more TCI states are scheduled for the PDSCH. In such configuration, the default TCI codepoint may include two different TCI states with lowest TCI state IDs from a set of TCI states.

In another configuration, if the apparatus 1302 include means for receiving the multiple DCIs from the multiple TRPs of the base station, the apparatus 1302 may include means for determining the TCI state for each of the multiple TRPs based on a default TCI state associated with each of the multiple TRPs when two or more TCI states are scheduled for the PDSCH. In such configuration, each of the multiple TRPs may be associated with a CORESET pool that includes multiple TCI states, and the default TCI state for each of the multiple TRPs may be selected from the CORESET pool corresponding to each of the multiple TRPs. In such configuration, the default TCI state may correspond to a CORESET with a lowest CORESET ID in the CORESET pool.

In another configuration, the apparatus 1302 may include means for determining the TCI state based on one or more TCI states used for receiving PDCCH. In such configuration, if the apparatus 1302 includes means for receiving the single DCI from a single TRP of the base station, the apparatus 1302 may include means for determining the TCI state for each of the multiple TRPs based on a TCI codepoint that indicates a first TCI state used for the PDCCH comprising the DCI and a second TCI state that is not used by the base station for transmitting the PDCCH. In such configuration, the first TCI state may be for the TRP from which the single DCI is received, and the second TCI state may be for a second TRP. In such configuration, the TCI codepoint may have a lowest codepoint ID among multiple TCI codepoints.

In another configuration, if the apparatus 1302 include means for receiving the multiple DCIs from the multiple TRPs of the base station, then the TCI state for each of the multiple TRPs may correspond to the TCI state used for receiving the PDCCH includes DCI from a respective TRP.

In another configuration, the apparatus 1302 may include means for determining the TCI state for each of the multiple TRPs based on TCI states for a previous PDSCH in a same BWP or in a same CC. If there is no previous PDSCH in the same BWP or the same CC, the apparatus 1302 may receive the PDSCH from a single TRP of the base station.

In another configuration, the apparatus 1302 may include means for identifying a number of TCI states scheduled for the PDSCH based on a field in the DCI or a configuration. In another configuration, the apparatus 1302 may include means for identifying a mapping from antenna ports to the TCI state used to transmit the PDSCH based on a field in the DCI or a configuration. In another configuration, the apparatus 1302 may include means for identifying a resource allocation for repetitions associated with the PDSCH based on a field in the DCI or a configuration.

The aforementioned means may be one or more of the aforementioned components of the apparatus 1302 configured to perform the functions recited by the aforementioned means. As described supra, the apparatus 1302 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 14:
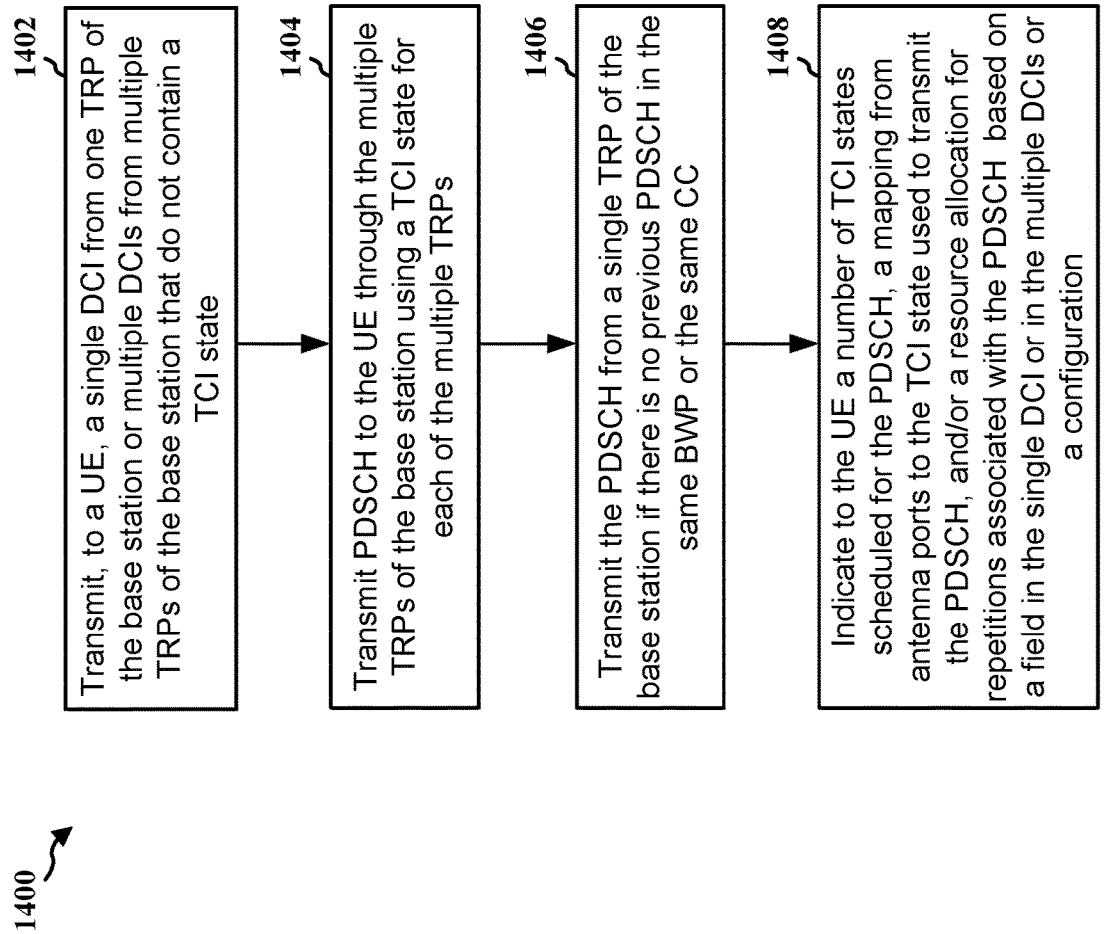
FIG. 14 is a flowchart of a method of wireless communication.

FIG. 14 is a flowchart 1400 of a method of wireless communication. The method may be performed by a base station or a component of a base station (e.g., the base station 102, 180, 310, 404, 504, 804, 904, 1004, 1104; the apparatus 1602; a processing system, which may include the memory 376 and which may be the entire base station 310 or a component of the base station 310, such as the TX processor 316 the RX processor 370, and/or the controller/processor 375). The method may enable the base station to determine a TCI state for transmitting PDSCH from multiple TRPs of the base station when the DCI scheduling the PDSCH does not include a TCI state.

At 1402, the base station may transmit, to a UE, a single DCI from one TRP of the base station or multiple DCIs from multiple TRPs of the base station that do not contain a TCI state, such as described in connection with FIGS. 8 to 11. For example, at 1110 or at 1112 of FIG. 11, the base station 1104 may transmit a single DCI from a TRP or multiple DCIs from multiple TRPs (e.g., 1106, 1108) of the base station 1104 to the UE 1102 that do not contain a TCI state. The transmission of the single DCI or the multiple DCIs may be performed by, e.g., the DCI configuration component 1640 and/or the transmission component 1634 of the apparatus 1602 in FIG. 16.

In one example, the base station may transmit the single DCI or the multiple DCI in a fallback DCI format. The base station may include additional information in the fallback DCI format that identifies at least one of a number of TCI states associated with the PDSCH, an antenna port field associated with the PDSCH, or resource allocation for repetition associated with the PDSCH.

At 1404, the base station may transmit PDSCH to the UE through the multiple TRPs of the base station using a TCI state for each of the multiple TRPs, such as described in connection with FIGS. 8 to 11. For example, at 1118 of FIG. 11, the base station 1104 may transmit the PDSCH from the multiple TRPs of the base station to the UE 1102 based on the default TCI state rule. The transmission of the PDSCH through the multiple TRPs of the base station using a TCI state for each of the multiple TRPs may be performed by, e.g., the PDSCH configuration component 1642 and/or the transmission component 1634 of the apparatus 1602 in FIG. 16. In some examples, the base station may also determine the TCI state based on a time difference between transmitting the single DCI or multiple DCIs and transmitting the PDSCH.

In one example, if the base station transmits the single DCI from a single TRP of the base station scheduling the PDSCH from the multiple TRPs, the TCI state for each of the multiple TRPs may be based on a default TCI codepoint if two or more TCI states are scheduled for the PDSCH. For example, the default TCI codepoint may include two different TCI states with lowest TCI state IDs from a set of TCI states.

In another example, if the base station transmits the multiple DCIs from the multiple TRPs of the base station, the TCI state for each of the multiple TRPs may be based on a default TCI state associated with each of the multiple TRPs when two or more TCI states are scheduled for the PDSCH. For example, each of the multiple TRPs may be associated with a CORESET pool that includes multiple TCI states, and the default TCI state for each of the multiple TRPs may be selected from the CORESET pool corresponding to each of the multiple TRPs. For example, the default TCI state may correspond to a CORESET with a lowest CORESET ID in the CORESET pool.

In another example, the TCI state may be based on one or more TCI states used for transmitting PDCCH. For example, if the base station transmits the single DCI from a single TRP of the base station, the TCI state for each of the multiple TRPs may be based on a TCI codepoint that indicates a first TCI state used for the PDCCH includes the DCI and a second TCI state that is not used by the base station for transmitting the PDCCH. For example, the first TCI state may be for the TRP from which the single DCI is transmitted, and the second TCI state may be for a second TRP. In another example, the TCI codepoint may have a lowest codepoint ID among multiple TCI codepoints.

In another example, if the base station transmits the multiple DCIs from the multiple TRPs of the base station, the TCI state for each of the multiple TRPs may correspond to the TCI state used for transmitting the PDCCH includes DCI from a respective TRP.

In another example, the TCI state for each of the multiple TRPs may be based on TCI states for a previous PDSCH in a same BWP or in a same CC. At 1406, if there is no previous PDSCH in the same BWP or the same CC, the base station may transmit the PDSCH from a single TRP of the base station.

At 1408, in some examples, the base station may indicate to the UE a number of TCI states scheduled for the PDSCH based on a field in the DCI or a configuration. In another example, the base station may indicate to the UE a mapping from antenna ports to the TCI state used to transmit the PDSCH based on a field in the DCI or a configuration. In another example, the base station may indicate to the UE a resource allocation for repetitions associated with the PDSCH based on a field in the DCI or a configuration.

Figure 15:
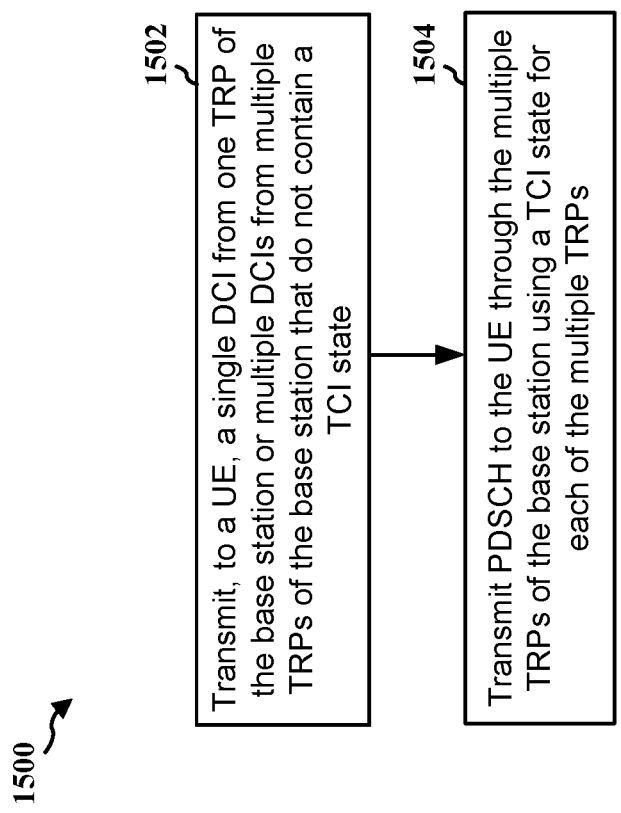
FIG. 15 is a flowchart of a method of wireless communication.

FIG. 15 is a flowchart 1500 of a method of wireless communication. The method may be performed by a base station or a component of a base station (e.g., the base station 102, 180, 310, 404, 504, 804, 904, 1004, 1104; the apparatus 1602; a processing system, which may include the memory 376 and which may be the entire base station 310 or a component of the base station 310, such as the TX processor 316 the RX processor 370, and/or the controller/processor 375). The method may enable the base station to determine a TCI state for transmitting PDSCH from multiple TRPs of the base station when the DCI scheduling the PDSCH does not include a TCI state.

At 1502, the base station may transmit, to a UE, a single DCI from one TRP of the base station or multiple DCIs from multiple TRPs of the base station that do not contain a TCI state, such as described in connection with FIGS. 8 to 11. For example, at 1110 or at 1112 of FIG. 11, the base station 1104 may transmit a single DCI from a TRP or multiple DCIs from multiple TRPs (e.g., 1106, 1108) of the base station 1104 to the UE 1102 that do not contain a TCI state. The transmission of the single DCI or the multiple DCIs may be performed by, e.g., the DCI configuration component 1640 and/or the transmission component 1634 of the apparatus 1602 in FIG. 16.

In one example, the base station may transmit the single DCI or the multiple DCI in a fallback DCI format. The base station may include additional information in the fallback DCI format that identifies at least one of a number of TCI states associated with the PDSCH, an antenna port field associated with the PDSCH, or resource allocation for repetition associated with the PDSCH.

At 1504, the base station may transmit PDSCH to the UE through the multiple TRPs of the base station using a TCI state for each of the multiple TRPs, such as described in connection with FIGS. 8 to 11. For example, at 1118 of FIG. 11, the base station 1104 may transmit the PDSCH from the multiple TRPs of the base station to the UE 1102 based on the default TCI state rule. The transmission of the PDSCH through the multiple TRPs of the base station using a TCI state for each of the multiple TRPs may be performed by, e.g., the PDSCH configuration component 1642 and/or the transmission component 1634 of the apparatus 1602 in FIG. 16. In some examples, the base station may also determine the TCI state based on a time difference between transmitting the single DCI or multiple DCIs and transmitting the PDSCH.

In one example, if the base station transmits the single DCI from a single TRP of the base station scheduling the PDSCH from the multiple TRPs, the TCI state for each of the multiple TRPs may be based on a default TCI codepoint if two or more TCI states are scheduled for the PDSCH. For example, the default TCI codepoint may include two different TCI states with lowest TCI state IDs from a set of TCI states.

In another example, if the base station transmits the multiple DCIs from the multiple TRPs of the base station, the TCI state for each of the multiple TRPs may be based on a default TCI state associated with each of the multiple TRPs when two or more TCI states are scheduled for the PDSCH. For example, each of the multiple TRPs may be associated with a CORESET pool that includes multiple TCI states, and the default TCI state for each of the multiple TRPs may be selected from the CORESET pool corresponding to each of the multiple TRPs. For example, the default TCI state may correspond to a CORESET with a lowest CORESET ID in the CORESET pool.

In another example, the TCI state may be based on one or more TCI states used for transmitting PDCCH. For example, if the base station transmits the single DCI from a single TRP of the base station, the TCI state for each of the multiple TRPs may be based on a TCI codepoint that indicates a first TCI state used for the PDCCH includes the DCI and a second TCI state that is not used by the base station for transmitting the PDCCH. For example, the first TCI state may be for the TRP from which the single DCI is transmitted, and the second TCI state may be for a second TRP. In another example, the TCI codepoint may have a lowest codepoint ID among multiple TCI codepoints.

In another example, if the base station transmits the multiple DCIs from the multiple TRPs of the base station, the TCI state for each of the multiple TRPs may correspond to the TCI state used for transmitting the PDCCH includes DCI from a respective TRP.

In another example, the TCI state for each of the multiple TRPs may be based on TCI states for a previous PDSCH in a same BWP or in a same CC. If there is no previous PDSCH in the same BWP or the same CC, the base station may transmit the PDSCH from a single TRP of the base station.

In some examples, the base station may indicate to the UE a number of TCI states scheduled for the PDSCH based on a field in the DCI or a configuration. In another example, the base station may indicate to the UE a mapping from antenna ports to the TCI state used to transmit the PDSCH based on a field in the DCI or a configuration. In another example, the base station may indicate to the UE a resource allocation for repetitions associated with the PDSCH based on a field in the DCI or a configuration.

Figure 16:
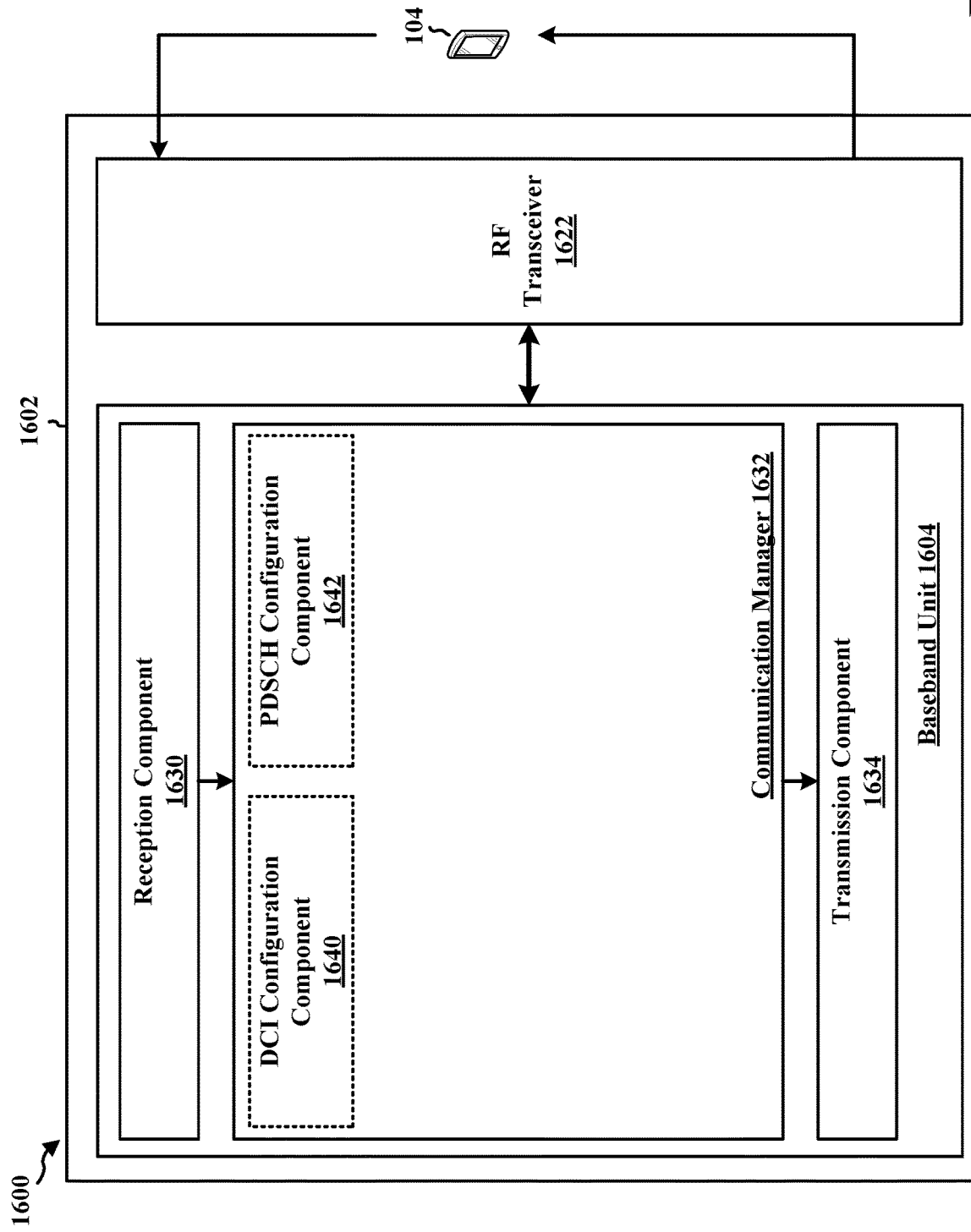
FIG. 16 is a diagram illustrating an example of a hardware implementation for an example apparatus.

FIG. 16 is a diagram 1600 illustrating an example of a hardware implementation for an apparatus 1602. The apparatus 1602 is a BS and includes a baseband unit 1604. The baseband unit 1604 may communicate through a RF transceiver unit 1622 with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the base station 310 and may include the memory 376 and/or at least one of the TX processor 316, the RX processor 370, and the controller/processor 375.

The communication manager 1632 includes a DCI configuration component 1640 that is configured to transmit, to a UE, a single DCI from one TRP of the base station or multiple DCIs from multiple TRPs of the base station that do not contain a TCI state, e.g., as described in connection with 1402 of FIG. 14 and/or 1502 of FIG. 15. The communication manager 1632 further includes a PDSCH configuration component 1642 that is configured to transmit PDSCH to the UE through the multiple TRPs of the base station using a TCI state for each of the multiple TRPs, e.g., as described in connection with 1404 of FIG. 14 and/or 1504 of FIG. 15.

The apparatus may include additional components that perform each of the blocks of the algorithm in the aforementioned flowcharts of FIGS. 14 and 15. As such, each block in the aforementioned flowchart of FIGS. 14 and 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602, and in particular the baseband unit 1604, includes means for transmitting, to a UE, a single DCI from one TRP of the base station or multiple DCIs from multiple TRPs of the base station that do not contain a TCI state (e.g., the DCI configuration component 1640 and/or the transmission component 1634). The apparatus 1602 includes means for transmitting PDSCH to the UE through the multiple TRPs of the base station using a TCI state for each of the multiple TRPs (e.g., the PDSCH configuration component 1642 and/or the transmission component 1634).

In one configuration, the apparatus 1602 may include means for transmitting the single DCI or the multiple DCI in a fallback DCI format. In such configuration, the apparatus 1602 may include additional information in the fallback DCI format that identifies at least one of a number of TCI states associated with the PDSCH, an antenna port field associated with the PDSCH, or resource allocation for repetition associated with the PDSCH.

In one configuration, the apparatus 1602 may include means for determining the TCI state based on a time difference between transmitting the single DCI or multiple DCIs and transmitting the PDSCH.

In one configuration, if the apparatus 1602 includes means for transmitting the single DCI from a single TRP of the apparatus 1602 scheduling the PDSCH from the multiple TRPs, the TCI state for each of the multiple TRPs may be based on a default TCI codepoint if two or more TCI states are scheduled for the PDSCH. In such configuration, the default TCI codepoint may include two different TCI states with lowest TCI state IDs from a set of TCI states.

In another configuration, if the apparatus 1602 includes means for transmitting the multiple DCIs from the multiple TRPs of the apparatus 1602, the TCI state for each of the multiple TRPs may be based on a default TCI state associated with each of the multiple TRPs when two or more TCI states are scheduled for the PDSCH. In such configuration, each of the multiple TRPs may be associated with a CORESET pool that includes multiple TCI states, and the default TCI state for each of the multiple TRPs may be selected from the CORESET pool corresponding to each of the multiple TRPs. In such configuration, the default TCI state may correspond to a CORESET with a lowest CORESET ID in the CORESET pool.

In another configuration, the TCI state may be based on one or more TCI states used for transmitting PDCCH. In such configuration, if the apparatus 1602 includes means for transmitting the single DCI from a single TRP of the apparatus 1602, the TCI state for each of the multiple TRPs may be based on a TCI codepoint that indicates a first TCI state used for the PDCCH includes the DCI and a second TCI state that is not used by the apparatus 1602 for transmitting the PDCCH. In such configuration, the first TCI state may be for the TRP from which the single DCI is transmitted, and the second TCI state may be for a second TRP. In such configuration, the TCI codepoint may have a lowest codepoint ID among multiple TCI codepoints.

In another configuration, if the apparatus 1602 includes means for transmitting the multiple DCIs from the multiple TRPs of the apparatus 1602, the TCI state for each of the multiple TRPs may correspond to the TCI state used for transmitting the PDCCH includes DCI from a respective TRP.

In another configuration, the TCI state for each of the multiple TRPs may be based on TCI states for a previous PDSCH in a same BWP or in a same CC. If there is no previous PDSCH in the same BWP or the same CC, the apparatus 1602 may transmit the PDSCH from a single TRP of the apparatus 1602.

In another configuration, the apparatus 1602 may include means for indicating to the UE a number of TCI states scheduled for the PDSCH based on a field in the DCI or a configuration. In another configuration, the apparatus 1602 may include means for indicating to the UE a mapping from antenna ports to the TCI state used to transmit the PDSCH based on a field in the DCI or a configuration. In another configuration, the apparatus 1602 may include means for indicating to the UE a resource allocation for repetitions associated with the PDSCH based on a field in the DCI or a configuration.

The aforementioned means may be one or more of the aforementioned components of the apparatus 1602 configured to perform the functions recited by the aforementioned means. As described supra, the apparatus 1602 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 17:
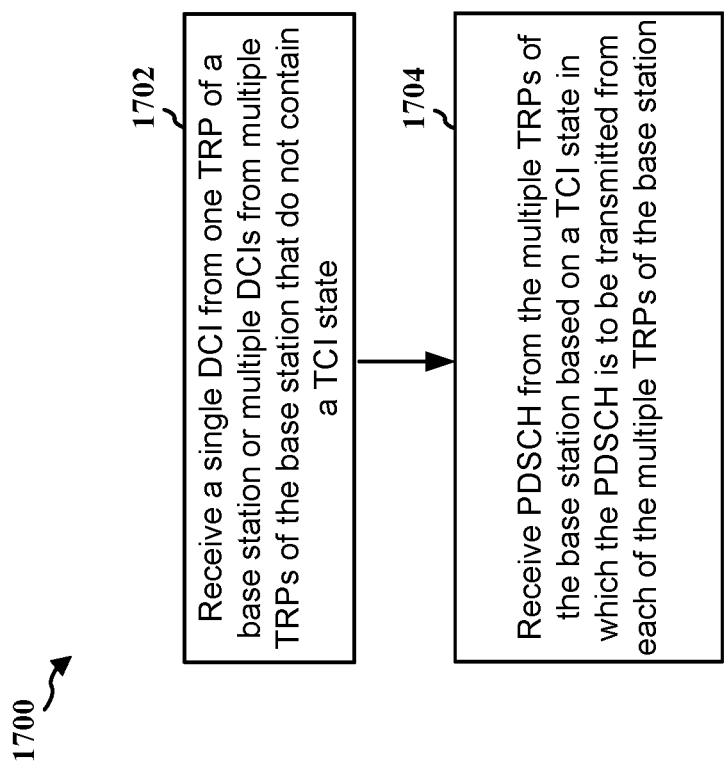
FIG. 17 is a flowchart of a method of wireless communication.

FIG. 17 is a flowchart of a method 1700 of wireless communication. The method may be performed by a UE or a component of a UE (e.g., the UE 104, 350, 402, 502, 802, 902, 1002, 1102; the apparatus 1802; a processing system, which may include the memory 360 and which may be the entire UE 350 or a component of the UE 350, such as the TX processor 368, the RX processor 356, and/or the controller/processor 359). The method may enable the UE to identify a TCI state for PDSCH transmitting from multiple TRPs of a base station when the DCI scheduling the PDSCH does not include a TCI state.

At 1702, the UE may receive a single DCI from one TRP of a base station or multiple DCIs from multiple TRPs of the base station that do not contain a TCI state, such as described in connection with FIGS. 8 to 11. For example, at 1110 or at 1112 of FIG. 11, the UE 1102 may receive a single DCI from a TRP or multiple DCIs from multiple TRPs (e.g., 1106, 1108) of the base station 1104 that do not contain a TCI state. The reception of the single DCI or the multiple DCIs may be performed by, e.g., the DCI process component 1840 and/or the reception component 1830 of the apparatus 1802 in FIG. 18.

In one example, the UE may identify a number of TCI states scheduled for the PDSCH based on a field in the DCI or a configuration. In another example, the UE may identify a mapping from antenna ports to the TCI state used to transmit the PDSCH based on a field in the DCI or a configuration. In another example, the UE may identify a resource allocation for repetitions associated with the PDSCH based on a field in the DCI or a configuration.

In one example, the UE may receive the single DCI or the multiple DCI in a fallback DCI format. The fallback DCI format may include additional information that identifies at least one of a number of TCI states associated with the PDSCH, an antenna port field associated with the PDSCH, or resource allocation for repetition associated with the PDSCH.

At 1704, the UE may receive PDSCH from the multiple TRPs of the base station based on a TCI state in which the PDSCH is to be transmitted from each of the multiple TRPs of the base station, such as described in connection with FIGS. 8 to 11. For example, at 1114 of FIG. 11, the UE 1102 may determine one or more TCI states in which the PDSCH is to be transmitted from the first TRP 1106 and the second TRP 1108 of the base station 1104 based on a default TCI state rule. Then, at 1118, the UE 1102 may receive PDSCH from the first TRP 1106 and/or the second TRP 1108 based on the default TCI state rule. The determination of the TCI state may be performed by, e.g., the TCI state determination component 1842 of the apparatus 1802 in FIG. 18.

In some examples, the UE may also determine the TCI state based on a time difference between receiving the single DCI or multiple DCIs and receiving the PDSCH.

In one example, as described in connection with FIG. 8, if the UE receives a single DCI from a single TRP of the base station scheduling the PDSCH from the multiple TRPs, the UE may determine the TCI state for each of the multiple TRPs based on a default TCI codepoint if two or more TCI states are scheduled for the PDSCH. For example, the default TCI codepoint may include two different TCI states with lowest TCI state IDs from a set of TCI states. If the UE receives the multiple DCIs from the multiple TRPs of the base station, the UE may determine the TCI state for each of the multiple TRPs based on a default TCI state associated with each of the multiple TRPs when two or more TCI states are scheduled for the PDSCH. For example, each of the multiple TRPs may be associated with a CORESET pool that includes multiple TCI states, and the default TCI state for each of the multiple TRPs may be selected from the CORESET pool corresponding to each of the multiple TRPs. For example, the default TCI state may correspond to a CORESET with a lowest CORESET ID in the CORESET pool.

In another example, as described in connection with FIG. 9, the UE may determine the TCI state based on one or more TCI states used for receiving PDCCH. For example, if the UE receives the single DCI from a single TRP of the base station, the UE may determine the TCI state for each of the multiple TRPs based on a TCI codepoint that indicates a first TCI state used for the PDCCH comprising the DCI and a second TCI state that is not used by the base station for transmitting the PDCCH. In one example, the first TCI state may be for the TRP from which the single DCI is received, and the second TCI state may be for a second TRP. In another example, the TCI codepoint may have a lowest codepoint ID among multiple TCI codepoints. On the other hand, if the UE receives the multiple DCIs from the multiple TRPs of the base station, then the TCI state for each of the multiple TRPs may correspond to the TCI state used for receiving the PDCCH includes DCI from a respective TRP.

In another example, as described in connection with FIG. 10, the UE may determine the TCI state for each of the multiple TRPs based on TCI states for a previous PDSCH in a same BWP or in a same CC. If there is no previous PDSCH in the same BWP or the same CC, the UE may receive the PDSCH from a single TRP of the base station.

In some examples, the UE may identify a number of TCI states scheduled for the PDSCH based on a field in the DCI or a configuration. In another example, the UE may identify a mapping from antenna ports to the TCI state used to transmit the PDSCH based on a field in the DCI or a configuration. In another example, the UE may identify a resource allocation for repetitions associated with the PDSCH based on a field in the DCI or a configuration.

Figure 18:
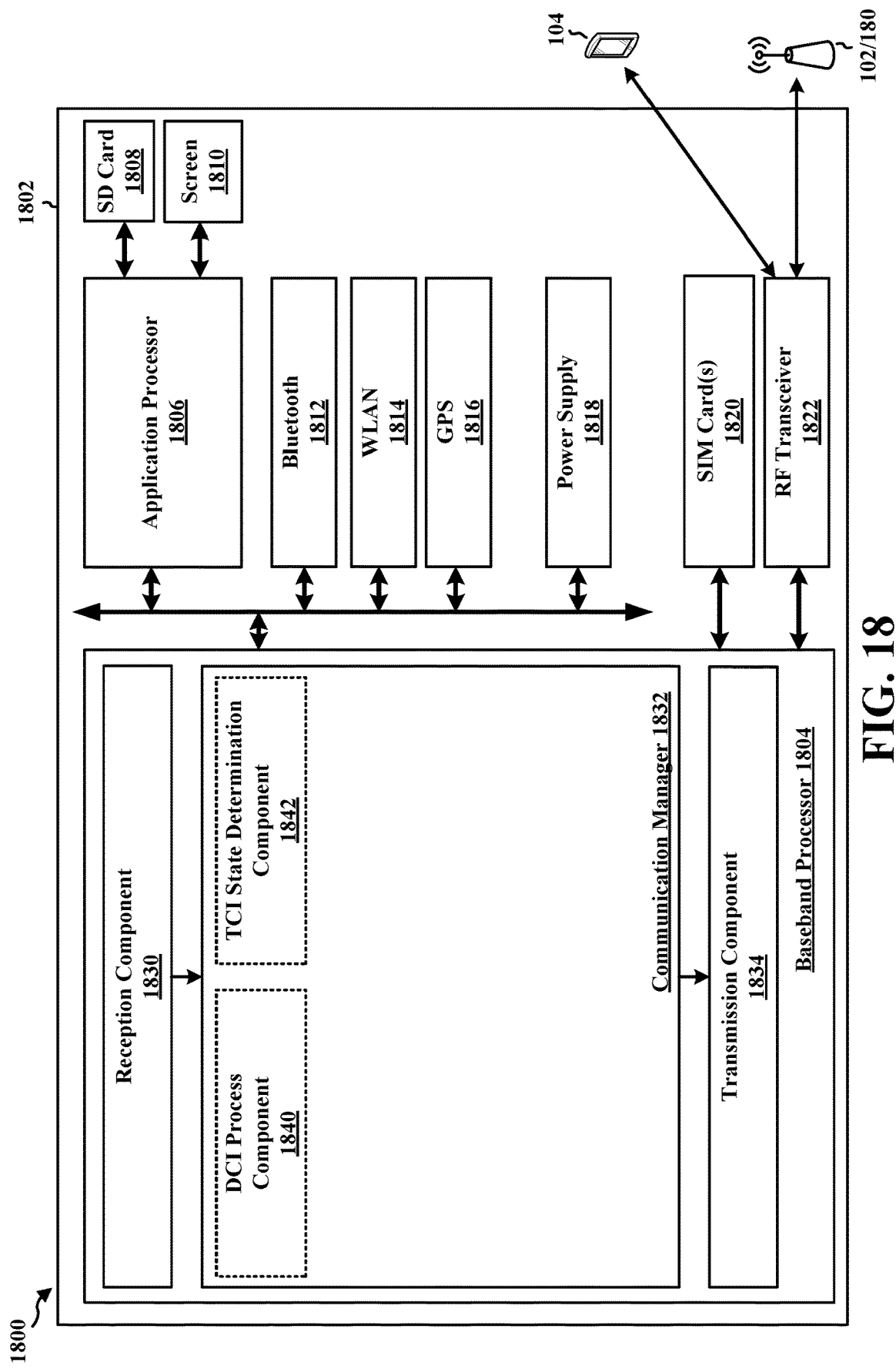
FIG. 18 is a diagram illustrating an example of a hardware implementation for an example apparatus.

FIG. 18 is a diagram 1800 illustrating an example of a hardware implementation for an apparatus 1802. The apparatus 1802 is a UE and includes a baseband processor 1804

(also referred to as a modem) coupled to a RF transceiver 1822 and one or more subscriber identity modules (SIM) cards 1820, an application processor 1806 coupled to a secure digital (SD) card 1808 and a screen 1810, a Bluetooth module 1812, a wireless local area network (WLAN) module 1814, a Global Positioning System (GPS) module 1816, and a power supply 1818. The baseband processor 1804 communicates through the RF transceiver 1822 with the UE 104 and/or BS 102/180. The baseband processor 1804 may include a computer-readable medium/memory. The baseband processor 1804 is responsible for general processing, including the execution of software stored on the computer-readable medium/memory. The software, when executed by the baseband processor 1804, causes the baseband processor 1804 to perform the various functions described supra. The computer-readable medium/memory may also be used for storing data that is manipulated by the baseband processor 1804 when executing software. The baseband processor 1804 further includes a reception component 1830, a communication manager 1832, and a transmission component 1834. The communication manager 1832 includes the one or more illustrated components. The components within the communication manager 1832 may be stored in the computer-readable medium/memory and/or configured as hardware within the baseband processor 1804. The baseband processor 1804 may be a component of the UE 350 and may include the memory 360 and/or at least one of the TX processor 368, the RX processor 356, and the controller/processor 359. In one configuration, the apparatus 1802 may be a modem chip and include just the baseband processor 1804, and in another configuration, the apparatus 1802 may be the entire UE (e.g., see 350 of FIG. 3) and include the additional modules of the apparatus 1802.

The communication manager 1832 includes a DCI process component 1840 that is configured to receive a single DCI from one TRP of a base station or multiple DCIs from multiple TRPs of the base station that do not contain a TCI state, e.g., as described in connection with 1702 of FIG. 17. The communication manager 1832 further includes a TCI state determination component 1842 that is configured to receive PDSCH from the multiple TRPs of the base station based on a TCI state in which the PDSCH is to be transmitted from each of the multiple TRPs of the base station, e.g., as described in connection with 1704 of FIG. 17.

The apparatus may include additional components that perform each of the blocks of the algorithm in the aforementioned flowchart of FIG. 17. As such, each block in the aforementioned flowchart of FIG. 17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1802, and in particular the baseband processor 1804, includes means for receiving a single DCI from one TRP of a base station or multiple DCIs from multiple TRPs of the base station that do not contain a TCI state (e.g., the DCI process component 1840 and/or the reception component 1830). The apparatus 1802 includes means for receiving PDSCH from the multiple TRPs of the base station based on a TCI state in which the PDSCH is to be transmitted from each of the multiple TRPs of the base station.

In one configuration, the apparatus 1802 may include means for identifying a number of TCI states scheduled for the PDSCH based on a field in the DCI or a configuration. In another configuration, the apparatus 1802 may include means for identifying a mapping from antenna ports to the TCI state used to transmit the PDSCH based on a field in the DCI or a configuration. In another configuration, the apparatus 1802 may include means for identifying a resource allocation for repetitions associated with the PDSCH based on a field in the DCI or a configuration.

In one configuration, the apparatus 1802 may receive the single DCI or the multiple DCI in a fallback DCI format. In such configuration, the fallback DCI format may include additional information that identifies at least one of a number of TCI states associated with the PDSCH, an antenna port field associated with the PDSCH, or resource allocation for repetition associated with the PDSCH.

In one configuration, the apparatus 1802 may also include means for determining the TCI state based on a time difference between receiving the single DCI or multiple DCIs and receiving the PDSCH.

In one configuration, if the apparatus 1802 includes means for receiving a single DCI from a single TRP of the base station scheduling the PDSCH from the multiple TRPs, the apparatus 1802 may include means for determining the TCI state for each of the multiple TRPs based on a default TCI codepoint if two or more TCI states are scheduled for the PDSCH. In such configuration, the default TCI codepoint may include two different TCI states with lowest TCI state IDs from a set of TCI states.

In another configuration, if the apparatus 1802 include means for receiving the multiple DCIs from the multiple TRPs of the base station, the apparatus 1802 may include means for determining the TCI state for each of the multiple TRPs based on a default TCI state associated with each of the multiple TRPs when two or more TCI states are scheduled for the PDSCH. In such configuration, each of the multiple TRPs may be associated with a CORESET pool that includes multiple TCI states, and the default TCI state for each of the multiple TRPs may be selected from the CORESET pool corresponding to each of the multiple TRPs. In such configuration, the default TCI state may correspond to a CORESET with a lowest CORESET ID in the CORESET pool.

In another configuration, the apparatus 1802 may include means for determining the TCI state based on one or more TCI states used for receiving PDCCH. In such configuration, if the apparatus 1802 includes means for receiving the single DCI from a single TRP of the base station, the apparatus 1802 may include means for determining the TCI state for each of the multiple TRPs based on a TCI codepoint that indicates a first TCI state used for the PDCCH comprising the DCI and a second TCI state that is not used by the base station for transmitting the PDCCH. In such configuration, the first TCI state may be for the TRP from which the single DCI is received, and the second TCI state may be for a second TRP. In such configuration, the TCI codepoint may have a lowest codepoint ID among multiple TCI codepoints.

In another configuration, if the apparatus 1802 include means for receiving the multiple DCIs from the multiple TRPs of the base station, then the TCI state for each of the multiple TRPs may correspond to the TCI state used for receiving the PDCCH includes DCI from a respective TRP.

In another configuration, the apparatus 1802 may include means for determining the TCI state for each of the multiple TRPs based on TCI states for a previous PDSCH in a same BWP or in a same CC. If there is no previous PDSCH in the same BWP or the same CC, the apparatus 1802 may receive the PDSCH from a single TRP of the base station.

In another configuration, the apparatus 1802 may include means for identifying a number of TCI states scheduled for the PDSCH based on a field in the DCI or a configuration. In another configuration, the apparatus 1802 may include means for identifying a mapping from antenna ports to the TCI state used to transmit the PDSCH based on a field in the DCI or a configuration. In another configuration, the apparatus 1802 may include means for identifying a resource allocation for repetitions associated with the PDSCH based on a field in the DCI or a configuration.

The aforementioned means may be one or more of the aforementioned components of the apparatus 1802 configured to perform the functions recited by the aforementioned means. As described supra, the apparatus 1802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a UE, including: receiving a single DCI from one TRP of a base station or multiple DCIs from multiple TRPs of the base station that do not contain a TCI state; and determining a TCI state in which PDSCH is to be transmitted from each of the multiple TRPs of the base station.

In aspect 2, the method of aspect 1 further includes: receiving the PDSCH from the multiple TRPs of the base station using the TCI state determined for each of the multiple TRPs.

In aspect 3, the method of aspect 1 or aspect 2 further includes that the UE determines the TCI state based on a time difference between receiving the single DCI or multiple DCIs and receiving the PDSCH.

In aspect 4, the method of any of aspects 1-3 further includes that the UE receives the single DCI from a single TRP of the base station scheduling the PDSCH from the multiple TRPs, the UE determines the TCI state for each of the multiple TRPs based on a default TCI codepoint if two or more TCI states are scheduled for the PDSCH.

In aspect 5, the method of any of aspects 1-4 further includes that the default TCI codepoint includes two different TCI states with lowest TCI state IDs from a set of TCI states.

In aspect 6, the method of any of aspects 1-3 further includes that the UE receives the multiple DCIs from the multiple TRPs of the base station, the UE determines the TCI state for each of the multiple TRPs based on a default TCI state associated with each of the multiple TRPs when two or more TCI states are scheduled for the PDSCH.

In aspect 7, the method of any of aspects 1-3 and 6 further includes that each of the multiple TRPs is associated with a CORESET pool that includes multiple TCI states, and the default TCI state for each of the multiple TRPs is selected from the CORESET pool corresponding to each of the multiple TRPs.

In aspect 8, the method of any of aspects 1-3, 6 and 7 further includes that the default TCI state corresponds to a CORESET with a lowest CORESET ID in the CORESET pool.

In aspect 9, the method of any of aspects 1-3 further includes that the UE determines the TCI state based on one or more TCI states used for receiving PDCCH.

In aspect 10, the method of any of aspects 1-3, 9 further includes that the UE receives the single DCI from a single TRP of the base station, and the UE determines the TCI state for each of the multiple TRPs based on a TCI codepoint that indicates a first TCI state used for the PDCCH including the DCI and a second TCI state that is not used by the base station for transmitting the PDCCH.

In aspect 11, the method of any of aspects 1-3, 9, 10 further includes that the first TCI state is for the TRP from which the single DCI is received, and the second TCI state is for a second TRP.

In aspect 12, the method of any of aspects 1-3 and 9-11 further includes that the TCI codepoint has a lowest codepoint ID among multiple TCI codepoints.

In aspect 13, the method of any of aspects 1-3 further includes that the UE receives the multiple DCIs from the multiple TRPs of the base station, and the TCI state for each of the multiple TRPs corresponds to the TCI state used for receiving the PDCCH includes DCI from a respective TRP.

In aspect 14, the method of any of aspects 1-3 further includes that the UE determines the TCI state for each of the multiple TRPs based on TCI states for a previous PDSCH in a same BWP or in a same CC.

In aspect 15, the method of any of aspects 1-3, 14 further includes: receiving the PDSCH from a single TRP of the base station if there is no previous PDSCH in the same BWP or the same CC.

In aspect 16, the method of any of aspects 1-15 further includes: identifying a number of TCI states scheduled for the PDSCH based on a field in the DCI or a configuration.

In aspect 17, the method of any of aspects 1-16 further includes: identifying a mapping from antenna ports to the TCI state used to transmit the PDSCH based on a field in the DCI or a configuration.

In aspect 18, the method of any of aspects 1-17 further includes: identifying a resource allocation for repetitions associated with the PDSCH based on a field in the DCI or a configuration.

In aspect 19, the method of any of aspects 1-18 further includes that the UE receives the single DCI or the multiple DCI in a fallback DCI format.

In aspect 20, the method of any of aspects 1-19 further includes that the fallback DCI format includes or identifies a number of TCI states associated with the PDSCH.

In aspect 21, the method of any of aspects 1-20 further includes that the fallback DCI format includes or identifies an antenna port field associated with the PDSCH.

In aspect 22, the method of any of aspects 1-21 further includes that the fallback DCI format includes or identifies resource allocation for repetition associated with the PDSCH.

Aspect 23 is an apparatus for wireless communication including at least one processor coupled to a memory and configured to implement a method as in any of aspects 1 to 22.

Aspect 24 is an apparatus for wireless communication including means for implementing a method as in any of aspects 1 to 22.

Aspect 25 is a non-transitory computer-readable medium storing computer executable code, where the code when executed by a processor causes the processor to implement a method as in any of aspects 1 to 22.

Aspect 26 is a method of wireless communication of a base station, including: transmitting, to a UE, a single DCI from one TRP of the base station or multiple DCIs from multiple TRPs of the base station that do not contain a TCI state; and transmitting PDSCH to the UE through the multiple TRPs of the base station using a TCI state for each of the multiple TRPs.

In aspect 27, the method of aspect 26 further includes that the TCI state is based on a time difference between transmitting the single DCI or multiple DCIs and transmitting the PDSCH.

In aspect 28, the method of aspect 26 or aspect 27 further includes that the base station transmits the single DCI from a single TRP of the base station scheduling the PDSCH from the multiple TRPs, the TCI state for each of the multiple TRPs is based on a default TCI codepoint if two or more TCI states are scheduled for the PDSCH.

In aspect 29, the method of any of aspects 26-28 further includes that the default TCI codepoint includes two different TCI states with lowest TCI state IDs from a set of TCI states.

In aspect 30, the method of any of aspects 26 and 27 further includes that the base station transmits the multiple DCIs from the multiple TRPs of the base station, the TCI state for each of the multiple TRPs is based on a default TCI state associated with each of the multiple TRPs when two or more TCI states are scheduled for the PDSCH.

In aspect 31, the method of any of aspects 26, 27 and 30 further includes that each of the multiple TRPs is associated with a CORESET pool that includes multiple TCI states, and the default TCI state for each of the multiple TRPs is selected from the CORESET pool corresponding to each of the multiple TRPs.

In aspect 32, the method of any of aspects 26, 27, 30 and 31 further includes that the default TCI state corresponds to a CORESET with a lowest CORESET ID in the CORESET pool.

In aspect 33, the method of any of aspects 26 and 27 further includes that the TCI state is based on one or more TCI states used for transmitting PDCCH.

In aspect 34, the method of any of aspects 26, 27 and 33 further includes that the base station transmits the single DCI from a single TRP of the base station, and the TCI state for each of the multiple TRPs is based on a TCI codepoint that indicates a first TCI state used for the PDCCH includes the DCI and a second TCI state that is not used by the base station for transmitting the PDCCH.

In aspect 35, the method of any of aspects 26, 27, 33 and 34 further includes that the first TCI state is for the TRP from which the single DCI is transmitted, and the second TCI state is for a second TRP.

In aspect 36, the method of any of aspects 26, 27 and 33-35 further includes that the TCI codepoint has a lowest codepoint ID among multiple TCI codepoints.

In aspect 37, the method of any of aspects 26, 27 and 33 further includes that the base station transmits the multiple DCIs from the multiple TRPs of the base station, and the TCI state for each of the multiple TRPs corresponds to the TCI state used for transmitting the PDCCH includes DCI from a respective TRP.

In aspect 38, the method of any of aspects 26 and 27 further includes that the TCI state for each of the multiple TRPs is based on TCI states for a previous PDSCH in a same BWP or in a same CC.

In aspect 39, the method of any of aspects 26, 27 and 38 further includes: transmitting the PDSCH from a single TRP of the base station if there is no previous PDSCH in the same BWP or the same CC.

In aspect 40, the method of any of aspects 26-39 further includes: indicating to the UE a number of TCI states scheduled for the PDSCH in the single DCI or in the multiple DCIs.

In aspect 41, the method of any of aspects 26-40 further includes: indicating to the UE a mapping from antenna ports to the TCI state used to transmit the PDSCH based on a field in the DCI or a configuration.

In aspect 42, the method of any of aspects 26-41 further includes: indicating to the UE a resource allocation for repetitions associated with the PDSCH based on a field in the DCI or a configuration.

In aspect 43, the method of any of aspects 26-42 further includes that the base station transmits the single DCI or the multiple DCI in a fallback DCI format.

In aspect 44, the method of any of aspects 26-43 further includes that the fallback DCI format includes or identifies a number of TCI states associated with the PDSCH.

In aspect 45, the method of any of aspects 26-44 further includes that the fallback DCI format includes or identifies an antenna port field associated with the PDSCH.

In aspect 46, the method of any of aspects 26-45 further includes that the fallback DCI format includes or identifies resource allocation for repetition associated with the PDSCH.

Aspect 47 is an apparatus for wireless communication including at least one processor coupled to a memory and configured to implement a method as in any of aspects 26 to 46.

Aspect 48 is an apparatus for wireless communication including means for implementing a method as in any of aspects 26 to 46.

Aspect 49 is a computer-readable medium storing computer executable code, where the code when executed by a processor causes the processor to implement a method as in any of aspects 26 to 46.

Aspect 50 is an apparatus for wireless communication including at least one processor coupled to a memory and configured to receive a single DCI from one TRP of a base station or multiple DCIs from multiple TRPs of the base station that do not contain a TCI state; and receive PDSCH from the multiple TRPs of the base station based on a TCI state in which the PDSCH is to be transmitted from each of the multiple TRPs of the base station.

Aspect 51 is the apparatus of aspect 50, where the TCI state is based on a time difference between receiving the single DCI or the multiple DCIs and receiving the PDSCH.

Aspect 52 is the apparatus of any of aspects 50 and 51, where the single DCI is received from a single TRP of the base station scheduling the PDSCH from the multiple TRPs, and the TCI state for each of the multiple TRPs is based on a default TCI codepoint if two or more TCI states are scheduled for the PDSCH.

Aspect 53 is the apparatus of any of aspects 50 to 52, where the default TCI codepoint includes two different TCI states with lowest TCI state IDs from a set of TCI states.

Aspect 54 is the apparatus of any of aspects 50 to 53, where the multiple DCIs are received from the multiple TRPs of the base station, and the TCI state for each of the multiple TRPs is based on a default TCI state associated with each of the multiple TRPs when two or more TCI states are scheduled for the PDSCH.

Aspect 55 is the apparatus of any of aspects 50 to 54, where each of the multiple TRPs is associated with a CORESET pool that includes multiple TCI states, and the default TCI state for each of the multiple TRPs is selected from the CORESET pool corresponding to each of the multiple TRPs.

Aspect 56 is the apparatus of any of aspects 50 to 55, where the default TCI state corresponds to a CORESET with a lowest CORESET ID in the CORESET pool.

Aspect 57 is the apparatus of any of aspects 50 to 56, where the TCI state is based on one or more TCI states used for receiving PDCCH.

Aspect 58 is the apparatus of any of aspects 50 to 57, where the single DCI is received from a single TRP of the base station, and the TCI state for each of the multiple TRPs is based on a TCI codepoint that indicates a first TCI state used for the PDCCH including the DCI and a second TCI state that is not used by the base station for transmitting the PDCCH.

Aspect 59 is the apparatus of any of aspects 50 to 58, where the first TCI state is for the TRP from which the single DCI is received, and the second TCI state is for a second TRP.

Aspect 60 is the apparatus of any of aspects 50 to 59, where the TCI codepoint has a lowest codepoint ID among multiple TCI codepoints.

Aspect 61 is the apparatus of any of aspects 50 to 60, where the multiple DCIs are received from the multiple TRPs of the base station, and the TCI state for each of the multiple TRPs corresponds to the TCI state used for receiving the PDCCH including DCI from a respective TRP.

Aspect 62 is the apparatus of any of aspects 50 to 61, where the TCI state for each of the multiple TRPs is based on TCI states for a previous PDSCH in a same BWP or in a same CC.

Aspect 63 is the apparatus of any of aspects 50 to 62, where the at least one processor and the memory are further configured to: receive the PDSCH from a single TRP of the base station if there is no previous PDSCH in the same BWP or the same CC.

Aspect 64 is the apparatus of any of aspects 50 to 63, where the at least one processor and the memory are further configured to: identify one or more of: a number of TCI states scheduled for the PDSCH based on a field in the DCI or a configuration, a mapping from antenna ports to the TCI state used to transmit the PDSCH based on a first field in the DCI or a first configuration, or a resource allocation for repetitions associated with the PDSCH based on a second field in the DCI or a second configuration.

Aspect 65 is the apparatus of any of aspects 50 to 64, where the single DCI or the multiple DCIs are received in a fallback DCI format.

Aspect 66 is the apparatus of any of aspects 50 to 65, where the fallback DCI format includes or identifies one or more of: a number of TCI states associated with the PDSCH, an antenna port field associated with the PDSCH, or a resource allocation for repetition associated with the PDSCH.

Aspect 67 is the apparatus of any of aspects 50 to 66, further including a transceiver coupled to the at least one processor.

Aspect 68 is a method of wireless communication for implementing any of aspects 50 to 67.

Aspect 69 is an apparatus for wireless communication including means for implementing any of aspects 50 to 67.

Aspect 70 is a computer-readable medium storing computer executable code, where the code when executed by a processor causes the processor to implement any of aspects 50 to 67.

Aspect 71 is an apparatus for wireless communication including at least one processor coupled to a memory and configured to transmit, to a UE, a single DCI from one TRP of the base station or multiple DCIs from multiple TRPs of the base station that do not contain a TCI state; and transmit PDSCH to the UE through the multiple TRPs of the base station using a TCI state for each of the multiple TRPs.

Aspect 72 is the apparatus of aspect 71, where the TCI state is based on a time difference between transmitting the single DCI or the multiple DCIs and transmitting the PDSCH.

Aspect 73 is the apparatus of any of aspects 71 and 72, where the single DCI is transmitted from a single TRP of the base station scheduling the PDSCH from the multiple TRPs, the TCI state for each of the multiple TRPs is based on a default TCI codepoint if two or more TCI states are scheduled for the PDSCH.

Aspect 74 is the apparatus of any of aspects 71 to 73, where the default TCI codepoint includes two different TCI states with lowest TCI state IDs from a set of TCI states.

Aspect 75 is the apparatus of any of aspects 71 to 74, where the multiple DCIs are transmitted from the multiple TRPs of the base station, and the TCI state for each of the multiple TRPs is based on a default TCI state associated with each of the multiple TRPs when two or more TCI states are scheduled for the PDSCH.

Aspect 76 is the apparatus of any of aspects 71 to 75, where each of the multiple TRPs is associated with a CORESET pool that includes multiple TCI states, and the default TCI state for each of the multiple TRPs is selected from the CORESET pool corresponding to each of the multiple TRPs.

Aspect 77 is the apparatus of any of aspects 71 to 76, where the default TCI state corresponds to a CORESET with a lowest CORESET ID in the CORESET pool.

Aspect 78 is the apparatus of any of aspects 71 to 77, where the TCI state is based on one or more TCI states used for transmitting PDCCH.

Aspect 79 is the apparatus of any of aspects 71 to 78, where the TCI state for each of the multiple TRPs is based on TCI states for a previous PDSCH in a same BWP or in a same CC.

Aspect 80 is the apparatus of any of aspects 71 to 79, where the single DCI or the multiple DCIs are transmitted in a fallback DCI format.

Aspect 81 is a method of wireless communication for implementing any of aspects 1 to 71 to 80.

Aspect 82 is an apparatus for wireless communication including means for implementing any of aspects 71 to 80.

Aspect 83 is a computer-readable medium storing computer executable code, where the code when executed by a processor causes the processor to implement any of aspects 71 to 80.

What is claimed is:

1. An apparatus for wireless communication at a user equipment (UE), comprising:
    memory; and
    at least one processor coupled to the memory and configured to:
        receive a single downlink control information (DCI) from one transmission and reception point (TRP) of a base station or multiple DCIs from multiple TRPs of the base station that do not contain a transmission configuration indicator (TCI) state; and
        receive physical downlink shared channel (PDSCH) from the multiple TRPs of the base station based on a TCI state in which the PDSCH is to be transmitted from each of the multiple TRPs of the base station, wherein the TCI state for each of the multiple TRPs is based on TCI states for a previous PDSCH in a same bandwidth part (BWP) or in a same carrier component (CC).

2. The apparatus of claim 1, wherein the TCI state is further based on a time difference between receiving the single DCI or the multiple DCIs and receiving the PDSCH.

3. The apparatus of claim 1, wherein the single DCI is received from a single TRP of the base station scheduling the PDSCH from the multiple TRPs, and the TCI state for each of the multiple TRPs is further based on a default TCI codepoint if two or more TCI states are scheduled for the PDSCH.

4. The apparatus of claim 3, wherein the default TCI codepoint comprises two different TCI states with lowest TCI state IDs from a set of TCI states.

5. The apparatus of claim 1, wherein the multiple DCIs are received from the multiple TRPs of the base station, and the TCI state for each of the multiple TRPs is further based on a default TCI state associated with each of the multiple TRPs when two or more TCI states are scheduled for the PDSCH.

6. The apparatus of claim 5, wherein each of the multiple TRPs is associated with a control resource set (CORESET) pool that comprises multiple TCI states, and the default TCI state for each of the multiple TRPs is selected from the CORESET pool corresponding to each of the multiple TRPs.

7. The apparatus of claim 6, wherein the default TCI state corresponds to a CORESET with a lowest CORESET ID in the CORESET pool.

8. The apparatus of claim 1, wherein the TCI state is further based on one or more TCI states used for receiving physical downlink control channel (PDCCH).

9. The apparatus of claim 8, wherein the single DCI is received from a single TRP of the base station, and the TCI state for each of the multiple TRPs is based on a TCI codepoint that indicates a first TCI state used for the PDCCH comprising the DCI and a second TCI state that is not used by the base station for transmitting the PDCCH.

10. The apparatus of claim 9, wherein the first TCI state is for the TRP from which the single DCI is received, and the second TCI state is for a second TRP.

11. The apparatus of claim 9, wherein the TCI codepoint has a lowest codepoint ID among multiple TCI codepoints.

12. The apparatus of claim 8, wherein the multiple DCIs are received from the multiple TRPs of the base station, and the TCI state for each of the multiple TRPs corresponds to the TCI state used for receiving the PDCCH comprising DCI from a respective TRP.

13. The apparatus of claim 1, wherein the at least one processor and the memory are further configured to:
    receive the PDSCH from a single TRP of the base station if there is no previous PDSCH in the same BWP or the same CC.

14. The apparatus of claim 1, wherein the at least one processor and the memory are further configured to:
    identify one or more of: a number of TCI states scheduled for the PDSCH based on a field in the DCI or a configuration, a mapping from antenna ports to the TCI state used to transmit the PDSCH based on a first field in the DCI or a first configuration, or a resource allocation for repetitions associated with the PDSCH based on a second field in the DCI or a second configuration.

15. The apparatus of claim 1, wherein the single DCI or the multiple DCIs are received in a fallback DCI format.

16. The apparatus of claim 15, wherein the fallback DCI format includes or identifies one or more of: a number of TCI states associated with the PDSCH, an antenna port field associated with the PDSCH, or a resource allocation for repetition associated with the PDSCH.

17. The apparatus of claim 1, further comprising a transceiver coupled to the at least one processor.

18. A method of wireless communication at a user equipment (UE), comprising: receiving a single downlink control information (DCI) from one transmission and reception point (TRP) of a base station that do not contain a transmission configuration indicator (TCI) state; and receiving a physical downlink shared channel (PDSCH) from the multiple TRPs of the base station based on a TCI state in which the PDSCH is to be transmitted from each of the multiple TRPs of the base station, wherein the TCI state for each of the multiple TRPs is based on TCI states for a previous PDSCH in a same bandwidth part (BWP) or in a same carrier component (CC).

19. An apparatus for wireless communication at a base station, comprising:
 memory; and
 at least one processor coupled to the memory and configured to:
  transmit, to a user equipment (UE), a single downlink control information (DCI) from one transmission and reception point (TRP) of the base station or multiple DCIs from multiple TRPs of the base station that do not contain a transmission configuration indicator (TCI) state; and
  transmit physical downlink shared channel (PDSCH) to the UE through the multiple TRPs of the base station using a TCI state for each of the multiple TRPs, wherein the TCI state for each of the multiple TRPs is based on TCI states for a previous PDSCH in a same bandwidth part (BWP) or in a same carrier component (CC).

20. The apparatus of claim 19, wherein the TCI state is further based on a time difference between transmitting the single DCI or the multiple DCIs and transmitting the PDSCH.

21. The apparatus of claim 19, wherein the single DCI is transmitted from a single TRP of the base station scheduling the PDSCH from the multiple TRPs, the TCI state for each of the multiple TRPs is further based on a default TCI codepoint if two or more TCI states are scheduled for the PDSCH.

22. The apparatus of claim 21, wherein the default TCI codepoint comprises two different TCI states with lowest TCI state IDs from a set of TCI states.

23. The apparatus of claim 19, wherein the multiple DCIs are transmitted from the multiple TRPs of the base station, and the TCI state for each of the multiple TRPs is further based on a default TCI state associated with each of the multiple TRPs when two or more TCI states are scheduled for the PDSCH.

24. The apparatus of claim 23, wherein each of the multiple TRPs is associated with a control resource set (CORESET) pool that comprises multiple TCI states, and the default TCI state for each of the multiple TRPs is selected from the CORESET pool corresponding to each of the multiple TRPs.

25. The apparatus of claim 24, wherein the default TCI state corresponds to a CORESET with a lowest CORESET ID in the CORESET pool.

26. The apparatus of claim 19, wherein the TCI state is further based on one or more TCI states used for transmitting physical downlink control channel (PDCCH).

27. The apparatus of claim 19, wherein the at least one processor and the memory are further configured to:
 transmit the PDSCH from a single TRP of the base station if there is no previous PDSCH in the same BWP or the same CC.

28. The apparatus of claim 19, wherein the single DCI or the multiple DCIs are transmitted in a fallback DCI format.

29. A method of wireless communication at a base station, comprising: transmitting, to a user equipment (UE), a single downlink control information (DCI) from one transmission and reception point (TRP) of the base station or multiple DCIs from multiple TRPs of the base station that do not contain a transmission configuration indicator (TCI) state; and transmitting a physical downlink shared channel (PDSCH) to the UE through the multiple TRPs of the base station using a TCI state for each of the multiple TRPs, wherein the TCI state for each of the multiple TRPs is based on TCI states for a previous PDSCH in a same bandwidth part (BWP) or in a same carrier component (CC).

* * * * *